(12) United States Patent
Yu et al.

(10) Patent No.: US 9,628,499 B1
(45) Date of Patent: Apr. 18, 2017

(54) STATISTICS-BASED ANOMALY DETECTION

(75) Inventors: Kevin Yu, Palo Alto, CA (US); Xinyi Zhang, San Jose, CA (US)

(73) Assignee: Google Inc., Mountain View, CA (US)

( * ) Notice: Subject to any disclaimer, the term of this patent is extended or adjusted under 35 U.S.C. 154(b) by 1153 days.

(21) Appl. No.: 13/569,688

(22) Filed: Aug. 8, 2012

(51) Int. Cl.
*H04L 29/06* (2006.01)
*G06F 21/56* (2013.01)
*G06F 21/31* (2013.01)
*G06F 21/55* (2013.01)

(52) U.S. Cl.
CPC ........ *H04L 63/1425* (2013.01); *G06F 21/552* (2013.01); *H04L 63/1416* (2013.01); *G06F 21/316* (2013.01)

(58) Field of Classification Search
CPC .. G06F 11/0709; G06F 11/076; G06F 21/552; G06F 21/316; H04L 63/1416; H04L 63/1425
USPC .......................................................... 702/185
See application file for complete search history.

(56) References Cited

U.S. PATENT DOCUMENTS

| | | | |
|---|---|---|---|
| 4,291,269 A | 9/1981 | Nossen | |
| 6,023,295 A | 2/2000 | Pau et al. | |
| 6,625,569 B2 | 9/2003 | James et al. | |
| 6,877,043 B2 | 4/2005 | Mallory et al. | |
| 7,080,290 B2 | 7/2006 | James et al. | |
| 7,523,016 B1 * | 4/2009 | Surdulescu | G06F 21/316 |
| | | | 702/185 |
| 7,620,868 B2 | 11/2009 | Tailliet et al. | |
| 7,716,011 B2 | 5/2010 | Thibaux et al. | |
| 7,802,165 B2 | 9/2010 | Jain et al. | |
| 7,869,544 B2 | 1/2011 | Sorna et al. | |
| 7,882,230 B2 | 2/2011 | Appleby et al. | |
| 8,090,592 B1 | 1/2012 | Goodall et al. | |
| 8,504,882 B2 | 8/2013 | Li et al. | |
| 8,806,313 B1 | 8/2014 | Yu et al. | |
| 8,812,586 B1 | 8/2014 | Kulkarni et al. | |
| 8,868,993 B1 | 10/2014 | Yu et al. | |
| 8,949,677 B1 | 2/2015 | Brundage et al. | |
| 8,954,361 B1 | 2/2015 | Phillips et al. | |

(Continued)

OTHER PUBLICATIONS

U.S. Appl. No. 13/488,875, filed Jun. 5, 2012.

(Continued)

*Primary Examiner* — Michael Nghiem
*Assistant Examiner* — Peter Ngo
(74) *Attorney, Agent, or Firm* — McDermott Will & Emery LLP

(57) ABSTRACT

Systems and methods are described herein for detecting an anomaly in a discrete signal, where samples in the signal correspond to amounts of data flow in a network within a time interval. The discrete signal is received, and a sequence of likelihoods corresponding to the sample values in the signal is generated. The likelihoods are based at least in part on a historical probability distribution of previously received sample values, and a likelihood is a probability of occurrence of a corresponding sample value in the signal. Likelihood change points are identified in the likelihood sequence, and the discrete signal is segmented into a plurality of segments at samples corresponding to the identified change points. A segment is identified as an anomaly based on a comparison between a statistic of the segment and a statistic of the historical probability distribution.

18 Claims, 11 Drawing Sheets

(56) References Cited

U.S. PATENT DOCUMENTS

| | | |
|---|---|---|
| 2002/0055826 A1 | 5/2002 | Wegerich et al. |
| 2003/0079160 A1 | 4/2003 | McGee et al. |
| 2003/0126289 A1 | 7/2003 | Aggarwal et al. |
| 2005/0220030 A1 | 10/2005 | Nagami et al. |
| 2005/0234667 A1 | 10/2005 | Hilton |
| 2008/0082299 A1 | 4/2008 | Samardzija et al. |
| 2008/0153423 A1 | 6/2008 | Armstrong et al. |
| 2008/0196100 A1 | 8/2008 | Madhavan et al. |
| 2008/0271038 A1 | 10/2008 | Rolia et al. |
| 2009/0017758 A1 | 1/2009 | Dorneich et al. |
| 2009/0018798 A1 | 1/2009 | Dorneich et al. |
| 2009/0125714 A1 | 5/2009 | Khosmood et al. |
| 2010/0023282 A1 | 1/2010 | Lewis et al. |
| 2010/0027432 A1 | 2/2010 | Gopalan et al. |
| 2010/0071061 A1 | 3/2010 | Crovella et al. |
| 2010/0106752 A1 | 4/2010 | Eckardt et al. |
| 2010/0290346 A1 | 11/2010 | Barford et al. |
| 2011/0119374 A1 | 5/2011 | Ruhl et al. |
| 2011/0173015 A1 | 7/2011 | Chapman et al. |
| 2011/0276887 A1 | 11/2011 | Cohen et al. |
| 2012/0140671 A1 | 6/2012 | Bukofser et al. |
| 2013/0085715 A1 | 4/2013 | Lakshminarayan et al. |
| 2013/0173215 A1 | 7/2013 | Patankar et al. |
| 2013/0227116 A1 | 8/2013 | Radhakrishnan et al. |
| 2014/0114609 A1 | 4/2014 | Maurer et al. |
| 2014/0172382 A1 | 6/2014 | Andrews et al. |
| 2015/0082432 A1 | 3/2015 | Eaton et al. |

OTHER PUBLICATIONS

U.S. Appl. No. 13/446,842, filed Apr. 13, 2012.
U.S. Appl. No. 13/480,084, filed May 24, 2012.
U.S. Appl. No. 13/483,601, filed May 30, 2012.
U.S. Appl. No. 13/824,144, filed Mar. 14, 2013.
U.S. Appl. No. 13/826,994, filed Mar. 14, 2013.
U.S. Appl. No. 13/480,042, filed May 24, 2012, Google Inc.
U.S. Appl. No. 13/488,875, filed Jun. 5, 2012, Google Inc.
Bosco, Bruno, et al, "A Robust Multivariate Long Run Analysis of European Electricity Prices," Nota di Lavoro, vol. 103, Sep. 2007, 29 pages.
Chen, Thomas M., "Network Traffic Modeling," The Handbook of Computer Networks, Hossein Bidgoli (ed.), Wiley, to appear 2007, 29 pages.
Escribano, Alvaro, et al.,"Modeling Electricity Prices: International Evidence," Working Paper 02-27, Economics Series 08, Departamento de Economia, Universidad Carlos III de Madrid, Spain, Jun. 2002, 32 pages.
Harvey, Andrew C., et al., "Trends and Cycles in Economic Time Series: A Bayesian Approach," Journal of Econometrics, vol. 140, 2007, pp. 618-649.
Huiqi Zhang, et al., "Change Point Detection based on Call Detail Records", IEEE, pp. 55-60, Jun. 8-9, 2011.
Jensen, Kare Jean, "Signal Processing for Distribution Network Monitoring." PhD Thesis, Technical University of Denmark, Department of Informatics and Mathematical Modeling, 1999, 219 pages.
Mahmoud A. Mahmoud et al., "A Change Point Method for Linear Profile Data", Quality and Reliability Engineering International, vol. 23, pp. 247-268, 2007.
US Notice of Allowance in U.S. Appl. No. 13/480,084 DTD Apr. 10, 2014.
US Office Action in U.S. Appl. No. 13/446,842 DTD Feb. 11, 2015.
US Office Action in U.S. Appl. No. 13/446,842 DTD Aug. 26, 2014.
US Office Action in U.S. Appl. No. 13/480,084 DTD Nov. 5, 2013.
US Office Action in U.S. Appl. No. 13/483,601 DTD Jan. 16, 2015.
US Office Action in U.S. Appl. No. 13/488,875 DTD Aug. 26, 2014.
US Office Action in U.S. Appl. No. 13/826,994 DTD Jul. 7, 2015.
US Office Action in U.S. Appl. No. 13/827,144 DTD Jul. 27, 2015.
US Office Action U.S. Appl. No. 13/446,842 DTD Jun. 22, 2015.
Zhang, Michael, et al, "A Nonlinear Autoregressive Conditional Duration Model with Applications to Financial Transaction Data" Graduate School of Business, University of Chicago, Jul. 1999, 53 pages.
Bandara, Vidarshana W. et al., "Extracting Baseline Patterns in Internet Traffic Using Robust Principal Components", 2011, 36th Annual IEEE Conference on Local Computer Networks, IEEE.
Du, Ping et al., "Detecting and Tracing Traffic Volume Anomalies in SINET3 Backbone Network", 2008, IEEE Communications Society, IEEE.
Hellerstein, Joseph M., "Quantitative Data Cleaning for Large Databases", Feb. 27, 2008, United Nations Economic Commision for Europe.
Malliga, S. et al., "Filtering Spoofed Traffic at Source End for Defending Against DoS/DDoS Attacks", 2008, Proceedings of the 2008 International Conference on Computing, Communication and Networking, IEEE.
Patcha, A. et al. 'An overview of anomaly detection techniques: existing solutions and latest technological trends', Computer Networks, vol. 51, Issue 12, pp. 3448-3470, Aug. 22, 2007.
US Advisory Action U.S. Appl. No. 13/446,842 DTD Oct. 2, 2015.
US Notice of Allowance on U.S. Appl. No. 13/480,042 DTD Dec. 15, 2015.
US Office Action in U.S. Appl. No. 13/480,124 DTD Aug. 12, 2014.
US Office Action in U.S. Appl. No. 13/251,080 dated Jul. 11, 2014.
US Office Action on U.S. Appl. No. 13/826,994 DTD Dec. 22, 2015.
US Office Action on U.S. Appl. No. 13/827,144 DTD Mar. 7, 2016.
US Office Action on U.S. Appl. No. 13/480,042 DTD Aug. 13, 2015.
Office Action issued Mar. 7, 2016 in U.S. Appl. No. 13/827,144.
Notice of Allowance issued Sep. 23, 2016 in U.S. Appl. No. 13/827,144.
Punskaya, Elena, et al. Bayesian Curve Fitting Using MCMC With Applications to Signal Segmentation, IEEE Transactions on Signal Processing, vol. 50, No. 3, Mar. 2002, pp. 747-758.
Schleip, Christoph. Climate change detection in natural systems by Bayesian methods. Doctoral dissertation, Technische Universitat München, 2009, 139 pages.
Office Action issued Oct. 5, 2016 in U.S. Appl. No. 14/144,099.
Notice of Allowance issued February 10, 2017 in U.S. Appl. No. 13/827,144.

\* cited by examiner

STATISTICS-BASED ANOMALY DETECTION

TECHNICAL FIELD

The systems and methods described herein relate to data analysis, and particularly, to detecting an anomaly in a signal.

BACKGROUND

Many signals derived from real world systems exhibit anomalous behaviors such as sudden and unexpected changes in the signal. It is often desirable to detect these anomalies in signals so that the anomalies may be characterized. Amplitude-based anomaly detection is based on identifying samples in a signal with low likelihood values. In amplitude-based processes, "soft computing" methods may be used, such as computing a likelihood value for each sample in a signal. In an example, these likelihood values are compared to a threshold likelihood value. The likelihood value may be computed based on an estimate of the probability distribution of a signal. Then, samples in a signal with low likelihood values may be identified as anomalies because based on the signal's probability distribution, these samples are unlikely to occur. However, amplitude-based anomaly detection has several disadvantages, such as being susceptible to long-term trends and cyclic patterns in the signal. In addition, amplitude-based anomaly detection methods are susceptible to high false alarm rates.

Anomaly detection is particularly suitable for applications in network management. In particular, identification of anomalies is especially useful for ensuring the efficiency and security of computer networks. For example, anomaly detection may be used to identify times and locations of suspicious traffic, such as network attacks, which adversely affect network operation by taking up bandwidth resulting in reduced quality of service. Thus, network administrators need to proactively identify anomalies in order to avoid or prevent attacks. It is therefore important for managers of successful networks to accurately identify anomalies in network traffic patterns with low false alarm rates.

Systems and methods to accurately detect anomalies would therefore be of great benefit in data analysis.

SUMMARY

Accordingly, the systems and methods described herein include, among other things, providing a method to detect anomalies in a signal. Samples in the discrete signal correspond to amounts of data flow in a network within a time interval. The method comprises receiving the discrete signal and generating a sequence of likelihoods corresponding to the sample values in the signal. The likelihoods are based at least in part on a historical probability distribution of previously received sample values, and a likelihood is a probability of occurrence of a corresponding sample value in the signal. Likelihood change points are identified in the likelihood sequence, and the discrete signal is segmented into a plurality of segments at samples corresponding to the identified change points. A segment is identified as an anomaly based on a comparison between a statistic of the segment and a statistic of the historical probability distribution.

In one embodiment, an anomaly is indicative of a deviation in the data flow from standard network operation. In one embodiment, the historical probability distribution represents amounts of data flow during standard network operation.

In one embodiment, a plurality of likelihoods preceding a change point have a first statistic value and a plurality of likelihoods following the change point have a second statistic value different from the first statistic value.

In one embodiment, a method for identifying likelihood change points comprises selecting a parameter L corresponding to a minimum number of samples in a segment. Then, L consecutive likelihoods are appended to a buffer, and a sequence of first sum values of the likelihoods in the buffer is computed. The method further comprises obtaining a sequence of second sum values, determining whether there is a change point in the buffer based at least in part on a comparison between the first and second sum values, and identifying a likelihood in the buffer as a change point based at least in part on the comparison.

Optionally, the first and second statistic values are mean values of the corresponding likelihoods. In this case, the sequence of first sum values is based on a cumulative sum sequence of the likelihoods in the buffer, and the sequence of second sum values is based on a cumulative sum sequence of randomly reordered likelihoods in the buffer. As an example, a cumulative sum sequence is computed based on a sequence of differences between the likelihoods and a mean of the likelihoods in the buffer. A change point is determined to be in the buffer when a maximal absolute first sum value exceeds a maximal absolute second sum value, and the change point corresponds to the maximal absolute first sum value.

Optionally, the first and second statistic values are median values of the corresponding likelihoods. In this case, the sequence of first sum values is based on a rank sum sequence of the likelihoods in the buffer, and the sequence of second sum values is based on a rank sum sequence of a linear function. The change point is identified as the likelihood corresponding to a first sum value substantially equal to a corresponding second sum value.

Optionally, when determining that there is a change point in the buffer, the method further comprises removing samples preceding the identified change point from the buffer and appending another L likelihoods to the buffer. Alternatively, when determining that there is not a change point in the buffer, the method further comprises appending another L likelihoods to the buffer.

In some embodiments, the statistic of the segment and the statistic of the historical probability distribution are medians of the corresponding sample values.

According to another aspect, the disclosure relates to an apparatus to carry out the method described above. In particular, an apparatus is described for identifying an anomaly in a discrete signal, wherein the discrete signal has sample values corresponding to amounts of data flow in a network within a time interval. The apparatus comprises a receiver processor for receiving the discrete signal and a likelihood generation processor for generating a sequence of likelihoods. The likelihoods correspond to sample values in the signal and are based at least in part on a historical probability distribution of previously received sample values. A likelihood is a probability of occurrence of a corresponding sample value in the signal. The apparatus further comprises a change point identification processor for identifying change points in the likelihood sequence and a segmentation processor for segmenting the discrete signal into a plurality of segments at samples corresponding to the identified change points. In addition, the apparatus comprises an anomaly identification processor for identifying a segment as an anomaly based on a comparison between a statistic of the segment and a statistic of the historical probability distribution.

In one embodiment, an anomaly is indicative of a deviation in the data flow from standard network operation. In one embodiment, the historical probability distribution represents amounts of data flow during standard network operation.

In one embodiment, a plurality of likelihoods preceding a change point have a first statistic value and a plurality of likelihoods following the change point have a second statistic value different from the first statistic value.

In one embodiment, the change point identification processor is configured to select a parameter L corresponding to a minimum number of samples in a segment, append L consecutive likelihoods to a buffer, compute a sequence of first sum values of the likelihoods in the buffer, and obtain a sequence of second sum values. In addition, the change point identification processor is further configured to determine whether there is a change point in the buffer based at least in part on a comparison between the first and second sum values. A likelihood in the buffer is identified as a change point based at least in part on the comparison.

Optionally, the first and second statistic values are mean values of the corresponding likelihoods. In this case, the change point identification processor computes the sequence of first sum values based on a cumulative sum sequence of the likelihoods in the buffer, and the sequence of second sum values is based on a cumulative sum sequence of randomly reordered likelihoods in the buffer. As an example, the change point identification processor computes the cumulative sum sequence based on a sequence of differences between the likelihoods and a mean of the likelihoods in the buffer. The change point identification processor determines that a change point is in the buffer when a maximal absolute first sum value exceeds a maximal absolute second sum value, and the change point corresponds to the maximal absolute first sum value.

Optionally, the first and second statistic values are median values of the corresponding likelihoods. In this case, the change point identification processor computes the sequence of first sum values based on a rank sum sequence of the likelihoods in the buffer, and the sequence of second sum values is based on a rank sum sequence of a linear function. The change point identification processor identifies the change point as the likelihood corresponding to a first sum value substantially equal to a corresponding second sum value.

Optionally, the apparatus further comprises a buffer update processor. When the change point identification processor determines that a change point is in the buffer, the buffer update processor removes samples preceding the identified change point from the buffer and appends another L likelihoods of the signal to the buffer. Alternatively, when the change point identification processor determines that there is not a change point in the buffer, the buffer update processor appends another L likelihoods to the buffer.

In some embodiments, the statistic of the segment and the statistic of the historical probability distribution are medians of the corresponding sample values.

BRIEF DESCRIPTION

The systems and methods described herein are set forth in the appended claims. However, for the purpose of explanation, several embodiments are set forth in the following figures.

DETAILED DESCRIPTION OF CERTAIN ILLUSTRATIVE EMBODIMENTS

To provide an overall understanding of the disclosure, certain illustrative embodiments will now be described, including a system for detecting an anomaly in a signal. However, it will be understood by one of ordinary skill in the art that the systems and methods described herein may be adapted and modified as is appropriate for the different applications being addressed and that the systems and methods described herein may be employed in other suitable applications, and that such other additions and modifications will not depart from the scope thereof.

Figure 1:
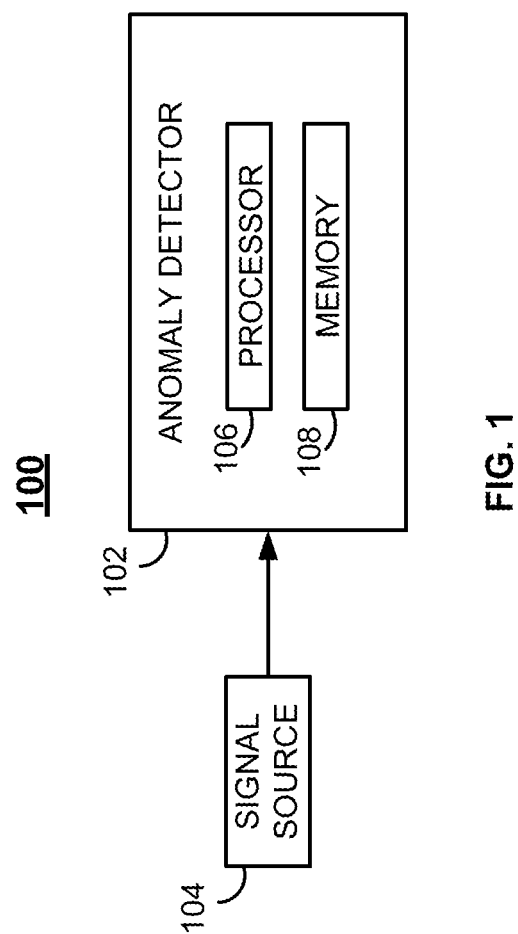
FIG. 1 illustrates one embodiment of a system for detecting anomalies in a signal.

FIG. 1 illustrates one embodiment of a system 100 for detecting anomalies of a signal. The system 100 includes a signal source 104 and an anomaly detector 102 including a processor 106 and a memory unit 108.

The signal source 104 provides a signal to the probability distribution estimator 102, and can be any source of a signal. The signal may be a discretized version of a continuous signal. As an example, the signal source 104 may include a device that monitors an amount of traffic flow in a network, and the signal may be a vector of discrete samples corresponding to an amount of traffic flow in the network as a function of time. In an example, the signal may correspond to a number of data packets arriving at a particular node in the network in a given time window. The signal source 104 may further be configured to process the signal to get the signal into a certain form, such as by controlling the amplitude of the signal or adjusting other characteristics of the signal. For example, the signal source 104 may quantize, filter, smooth, downsample, upsample, or interpolate the signal, or perform any number of processing techniques on the signal. In general, any signal source may be used, if it is desirable to detect anomalies in the provided signal.

The anomaly detector 102 is a device that detects anomalies in a signal provided by the signal source 104. An anomaly corresponds to a pattern in the signal that deviates from established normal behavior. Identifying anomalies in a signal is useful for many reasons. For example, the signal received from the signal source 104 may represent an amount of data traffic activity in a network. Network traffic is often bursty, meaning the signal includes unexpected and unpredictable bursts in activity. These traffic bursts may be identified as anomalies in a signal representative of an amount of network traffic over time. Identifying these bursts is important for characterizing activity levels in the network. In an example, if a large number of traffic bursts occurs at a specific location in a network, causing long latencies and poor network performance, one or more components at the network location may need to be replaced. For example, buffers that temporarily store incoming data at the network location may need to be replaced with larger buffers, which are better equipped to handle large amounts of data. Network traffic is just one example of where detection of anomalies may be useful. In general, anomaly detection is useful in a number of fields and may often lead to improved systems in multiple applications.

The anomaly detector 102 uses statistics-based anomaly detection to detect anomalies in the signal, meaning that signal statistics are used to detect anomalies in the signal. In particular, processes that use statistics-based anomaly detection determine a range of signal sample values based on one or more estimated statistics of the signal. For example, the range may correspond to a number of standard deviations away from a mean of the sample values, and values that fall outside the range may be identified as anomalies.

In some implementations, it is advantageous to limit the anomaly detection process to detect anomalies with at least minimal length. In particular, when anomaly detection is used for identifying abnormalities in network traffic patterns, it may be desirable to separate the analysis for short anomalies (i.e., traffic spikes or dips that include a single sample value falling outside the above-described range) and longer anomalies. Certain patterns of short anomalies, such as how often and when they occur, may be different from those of long anomalies. Therefore, the methods for prediction of these anomalies may be substantially different, and separate detection methods of short and long anomalies may be useful.

The systems and methods described herein relate to statistics-based anomaly detection by first segmenting a signal at samples corresponding to change points. The segments have at least a certain length, and the change points correspond to identified points in the signal where a statistic of the underlying distribution of the signal changes. In particular, the change points are identified based on a likelihood sequence, in which a sample in the signal has a corresponding likelihood value indicative of a probability of occurrence of the sample value. The likelihood value corresponds to a probability value in a historical probability distribution, which is based on a histogram of values of previously received samples. In the network traffic example, the historical probability distribution corresponds to a distribution of amounts of data traffic during standard network operation (i.e., without anomalies). Then, after the signal is segmented, one or more segments of the signal are identified as anomalies if a statistic (such as a mean or a median, for example) of the segment falls outside a range of sample values (such as a number of standard deviations away from the mean or median of the historical probability distribution, for example).

By first segmenting the signal and then identifying anomalous segments, the systems and methods for statistics-based anomaly detection described herein offer several advantages over other methods for anomaly detection. In particular, statistics-based anomaly detection is robust and is not as susceptible to noise as other methods (such as amplitude-based anomaly detection). In addition, statistics-based anomaly detection have lower false alarm rates compared to other methods because the segmentation occurs before anomaly identification. Statistics-based anomaly detection is therefore particularly suitable for applications in network traffic management, which require accurate identification of anomalies to ensure a network's efficiency and security. However, in general, the systems and methods described herein are applicable to identifying anomalies in any type of signal.

As is described in more detail in relation to FIGS. 2-6, the anomaly detector 102 identifies anomalies in a signal by segmenting the signal into multiple segments and identifying anomalous segments. A general overview of the anomaly detection method is described in relation to FIG. 2. The anomaly detector 102 first receives the signal and may process the received signal by identifying and removing a long-term trend and/or a cyclic pattern to obtain a residual signal that is generally centered around zero (i.e., described in relation to FIG. 3). The anomaly detector 102 then estimates a historical probability distribution of the signal based on previously received signals (i.e., described in relation to FIG. 4), and then computes a likelihood sequence based on the received signal and the historical probability distribution. Then, change points in the likelihood sequence are identified based on changes in a statistic (e.g., mean as described in relation to FIG. 5A or median as described in relation to FIG. 5C), and the signal is segmented into multiple segments at the identified change points. Finally, the anomaly detector 102 identifies anomalous segments (i.e., described in relation to FIG. 6).

The anomaly detector 102 includes a processor 106 and a memory unit 108. As used herein, the term "processor" or "computing device" refers to one or more computers, microprocessors, logic devices, servers, or other devices configured with hardware, firmware, and/or software to carry out one or more of the techniques described herein. An illustrative computing device 800, which may be used to implement any of the processors described herein, is described in detail below with reference to FIG. 8. The memory unit 108 is configured to store input data, output data, and data currently being processed by the processor 106.

Any suitable variation of system 100 may be used to detect an anomaly in a signal. For example, additional processors or memory units may be used to process or store data. In addition, the processor 106 may include a memory unit to store any or all of the data used during processing. In another example, the anomaly detector 102 may be included within the same device as the signal source 104. However, for ease of discussion, the remainder of this disclosure will describe detecting anomalies in a signal with reference to the system 100 of FIG. 1.

Figure 2:
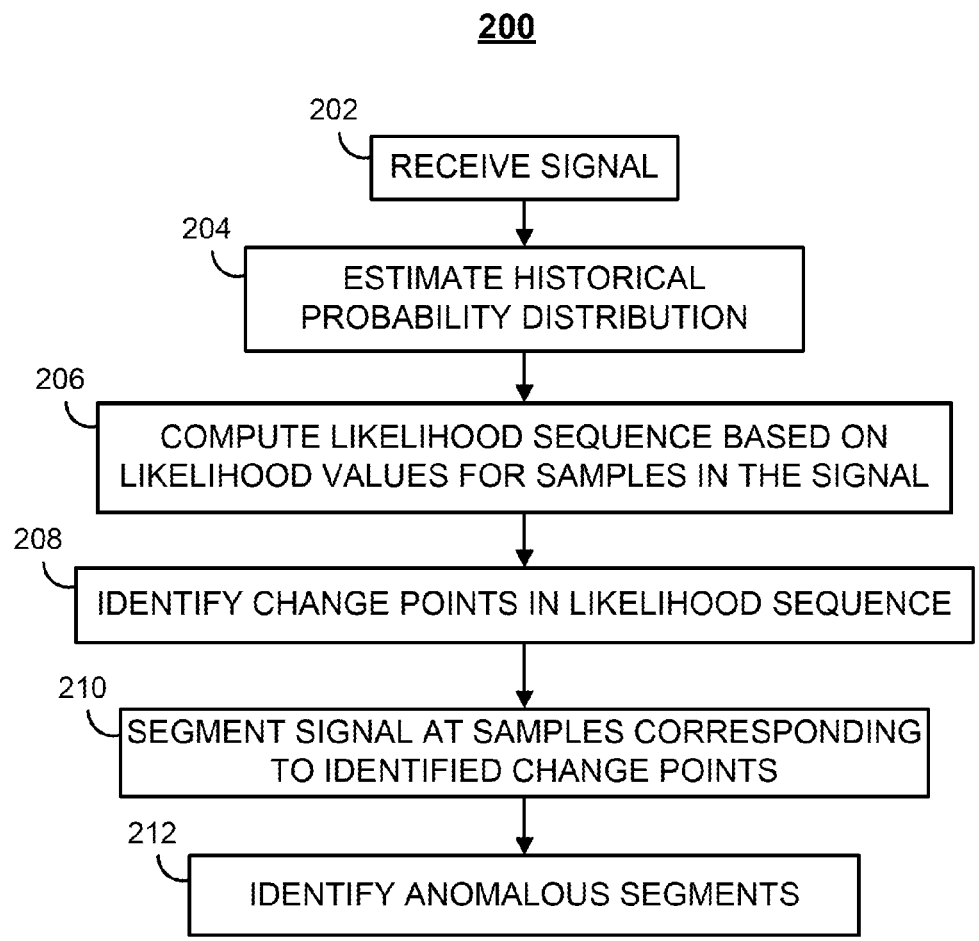
FIG. 2 is a flow chart of one illustrative method for detecting anomalies in a signal.

FIG. 2 is a flow chart of one illustrative method 200 used by the processor 106 for detecting an anomaly in a signal, such as a signal received by the signal source 104. In particular, the method 200 describes a method for identifying anomalous portions of a signal. Several steps in the method 200 are described in more detail in FIGS. 3-6. The method 200 begins with a step of computing a likelihood sequence for the samples in the signal. In particular, in the method 200, a likelihood value is computed for each sample in a signal. The likelihood value for each sample may be based on a historical probability distribution of the signal. Samples with low likelihood values are less likely to occur than samples with higher likelihood values. The method 200 further includes steps of segmenting the likelihood sequence and identifying segments of the likelihood sequence as anomalies. In particular, the segmentation is based on an identification of change points in the likelihood sequence. A segment is identified as an anomaly when a statistic corresponding to the segment is significantly different from a statistic corresponding to the historical probability distribution of the signal.

As is described in more detail for FIGS. 3-6, the method 200 identifies change points in the likelihood sequence. The likelihood change points may be identified using the methods depicted in FIGS. 5A-5C, or any other suitable method for identifying change points in a sequence. By segmenting the signal at samples corresponding to the identified likelihood change points and identifying anomalous segments, the method 200 provides robust anomaly detection.

The depicted method 200 includes the steps of receiving a signal (step 202), estimating a historical probability distribution of the signal (step 204), and computing a likelihood sequence based on computed likelihood values for samples in the signal (step 206). Change points in the likelihood sequence are identified (step 208), and the likelihood sequence is segmented at the identified change points (step 210). Finally, anomalous segments are identified (step 212).

Figure 3:
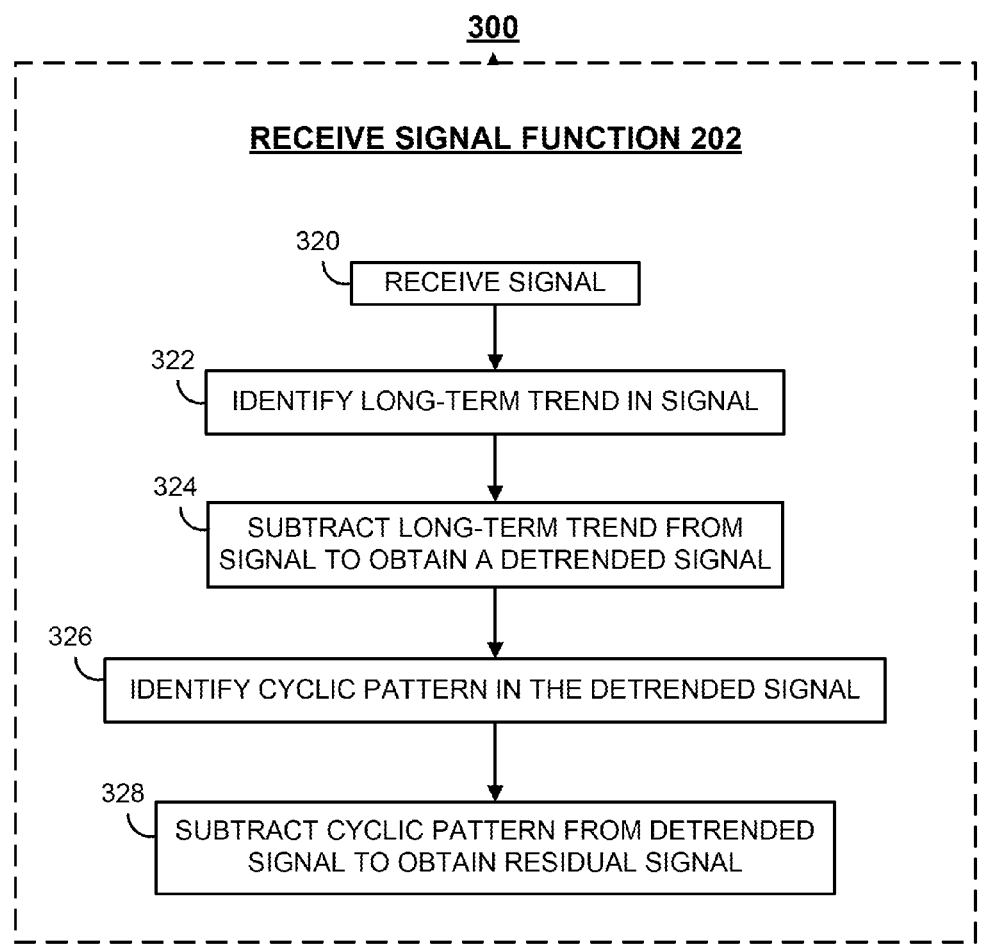
FIG. 3 is a flow chart of one illustrative method for receiving a signal.

First, at step 202, the processor 106 receives a signal from the signal source 104. As described in relation to FIG. 1, the signal may be representative of an amount of traffic flow in a network, such as a number of data packets that arrive at a location within a particular time window. Samples of the signal may be stored in the memory unit 108. In other applications, the signal may be representative of other events or values, and in general, any signal may be used. In particular, receiving the signal as depicted at step 202 may include invoking a call to a receive signal function, as depicted in FIG. 3. As is described in more detail in relation to FIG. 3, receiving the signal may include performing pre-processing on the signal, such as removing a long-term trend and/or removing a cyclic pattern from the signal to obtain a residual signal.

Figure 4:
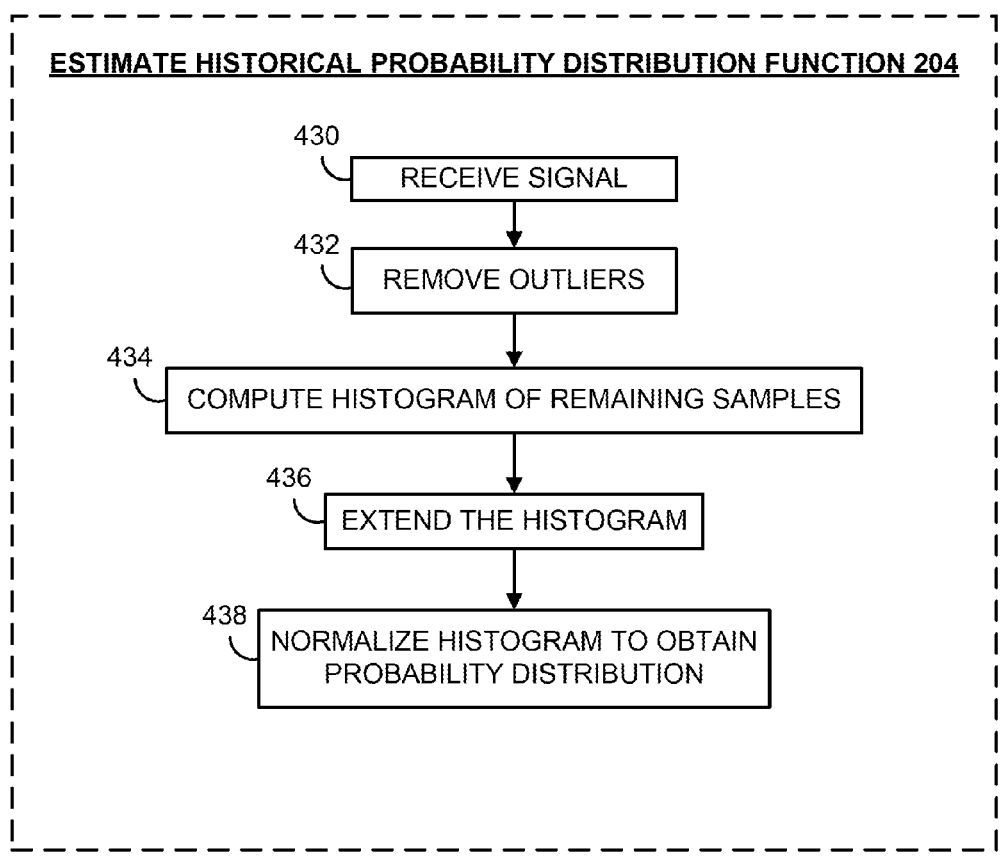
FIG. 4 is a flow chart of one illustrative method for estimating a historical probability distribution function of samples in a signal.

At step 204, the processor 106 estimates a historical probability distribution corresponding to previously received samples of the signal. In a residual signal, each sample may be modeled with the same random variable, such that the samples are identically distributed. The probability distribution of the samples may be estimated using probability distribution estimation methods. In particular, estimating a historical probability distribution as depicted at step 204 may include invoking a call to an estimate historical probability distribution function, as depicted in FIG. 4. As is described in more detail in relation to FIG. 4, outlier samples may be identified and removed from the signal, and a histogram may be generated based on the remaining samples. The histogram may then be extended (by using a parametric function to estimate the tails of the histogram) and normalized to result in an estimated probability distribution.

At step 206, the processor 106 computes a likelihood sequence based on the likelihood values for samples in the signal. In particular, the processor 106 computes a likelihood value for each sample in the signal. A likelihood value may be computed based on the estimated historical probability distribution of the signal (i.e., a likelihood value of a sample may be simply read off of the distribution). Thus, the likelihood value of a sample may be computed based on an estimated historical probability distribution of the received signal and is representative of a probability of occurrence of a corresponding sample value in the signal. However, any other suitable method of determining a likelihood value may be used. The likelihood value in units of probability may be used (ranging 0 to 1), or the log likelihood value may be used (ranging $-\text{Inf}$ to 0). Alternatively, any other processing may be performed on the likelihood values to appropriately scale and/or adjust the range of possible likelihood values. By using the likelihood values of corresponding samples in the signal, the systems and methods described herein provide a normalized representation of a signal that is not sensitive to the dynamic range and noise level of the original signal samples.

Figure 5A:
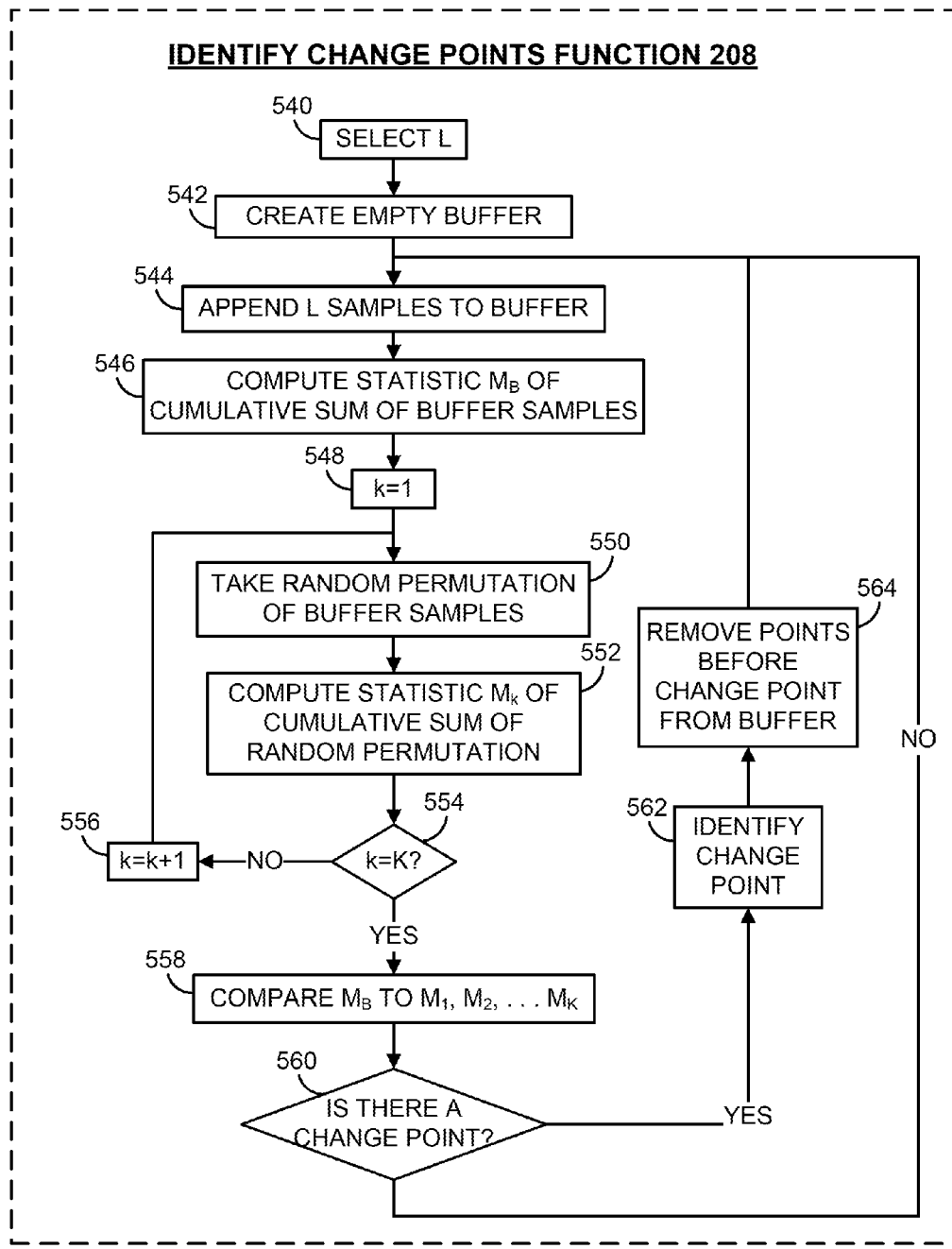
FIGS. 5A-5C are flow charts of illustrative methods for identifying change points in a signal.

At step 208, the processor 106 identifies change points in the likelihood sequence. In particular, identifying change points may include invoking a call to the identify change points function, as depicted in FIGS. 5A and 5C. As is described in more detail in relation to FIGS. 5A and 5C, a parameter L (corresponding to a minimum length of a segment) may be selected, and L samples of the likelihood sequence may be iteratively appended to a buffer. Then multiple iterations may be performed, and an iteration may include a series of steps. The steps include computing a first statistic of the buffer samples in a sorted order, re-ordering the buffer samples, and computing a second statistic of the re-ordered buffer samples. The processor 106 determines whether a point in the buffer is a likelihood change point based at least in part on a comparison between the first and second statistic. Then, the next L samples of the likelihood sequence are appended to the buffer, and the series of steps is repeated. Iterations are performed until the end of the likelihood sequence, resulting in a set of change points over the length of the likelihood sequence. As described herein, the methods depicted in FIGS. 5A and 5C are example ways to identify change points. In general, any suitable method of identifying change points in a sequence may be used.

At step 210, the processor 106 segments the signal at samples corresponding to the identified change points. In particular, the processor 106 may identify samples in the signal corresponding to identified change points in the likelihood sequence. In particular, each sample in the likelihood sequence has a corresponding sample in the signal. For example, for a given sample value in the signal, the corresponding likelihood sample value is computed based on the sample value and the historical probability distribution estimated at step 204. The signal may be segmented at the identified samples to obtain multiple segments.

Figure 6:
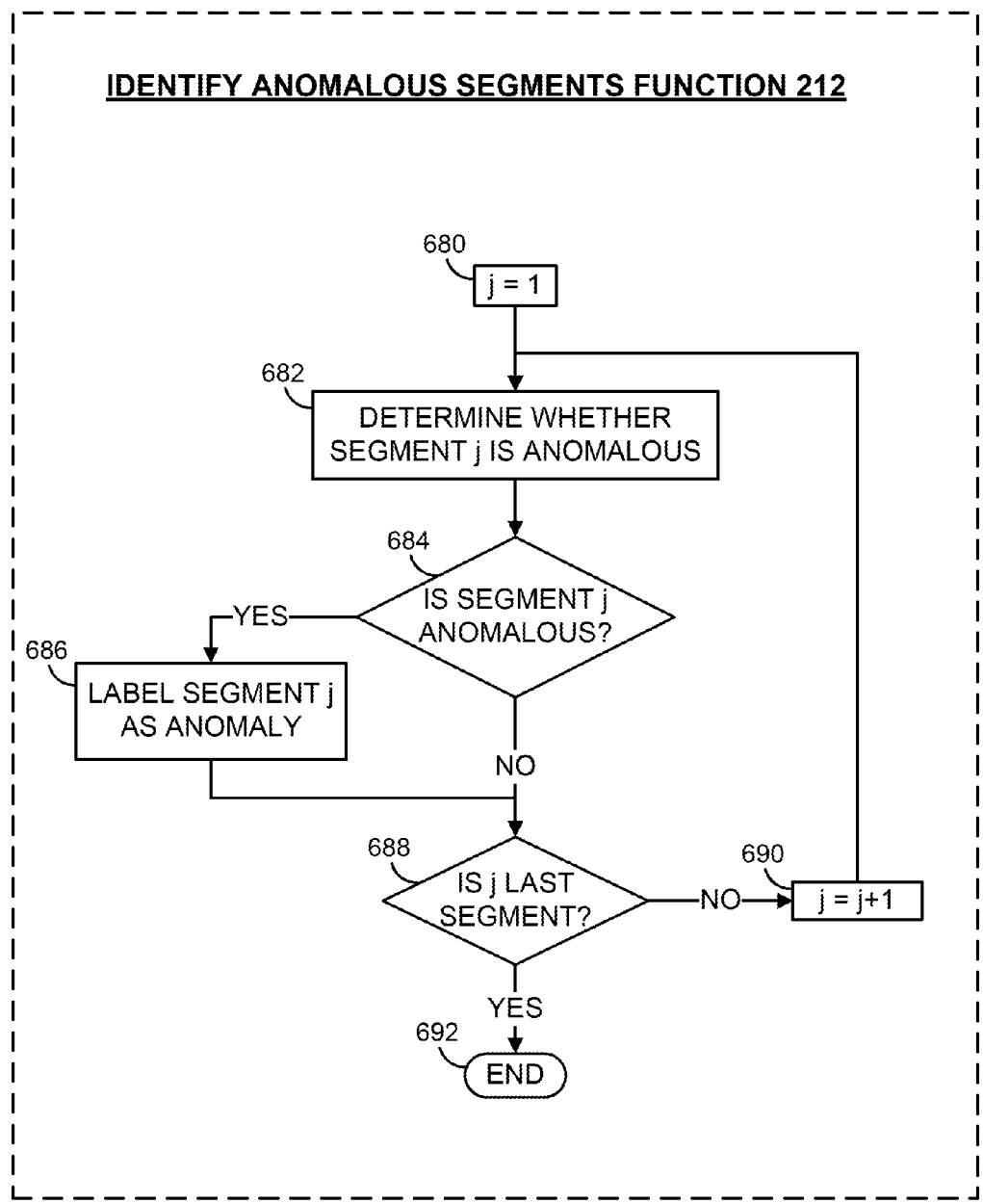
FIG. 6 is a flow chart of one illustrative method for identifying anomalous segments in a signal.

At step 212, the processor 106 identifies anomalous segments. In particular, identifying anomalous segments may include invoking a call to the identify anomalous segments function, as depicted in FIG. 6. As is described in more detail in relation to FIG. 6, the segments may be iteratively selected, and a statistic corresponding to the selected segment may be compared to a statistic of the estimated historical probability distribution. If the two statistics are significantly different (i.e., if the absolute difference exceeds a threshold, such as a number of standard deviations of the historical probability distribution), then the selected segment may be labeled as an anomaly. In general, any suitable method of identifying a segment as anomalous may be used.

FIG. 3 is a flow chart of one illustrative method 300 for receiving and processing a signal. In particular, the method 300 may be used by step 202 of the method 200 to receive a signal. The illustrated method 300 includes the use of a signal model to identify and remove various patterns in a signal. The remaining signal, or the residual signal, may then be used for anomaly detection. First removing patterns in the signal before performing anomaly detection may result in a decrease in the number of errors (false alarms and missed anomalies). Removal of identified trend and/or cyclic pattern results in a residual signal that may be provided to various anomaly detection processes.

The depicted method 300 includes the steps of receiving a signal (step 320), identifying a long-term trend in the signal (step 322), and subtracting the long-term trend from the signal to obtain a detrended signal (step 324). A cyclic pattern is then also identified from the detrended signal and subtracted from the detrended signal (steps 326 and 328, respectively).

First, at step 320, the processor 106 receives a signal from the signal source 104. As described in relation to FIG. 1, the signal may be representative of an amount of traffic flow in a network, such as a number of data packets that arrive at a location within a particular time window. In other applications, the signal may be representative of other events or values.

At step 322, the processor 106 identifies a long-term trend of the signal. The trend may include linear or nonlinear components. In general, a trend (linear or nonlinear) includes long-term and slow changes, such that the energy in a trend component is mostly concentrated near lower frequencies than other components in the signal. The method 300 may include identifying a linear and/or nonlinear trend component.

Determining a linear trend component of a signal may first include detecting trend change points in a signal, corresponding to points in a signal where the underlying distribution changes. Bayesian methods and maximum likelihood techniques may be used to detect trend change points in the signal. For example, a number of consecutive samples of the signal may be appended to a buffer, and Bayesian methods are used to determine which, if any, sample in the buffer corresponds to a trend change point. In addition, the processor 106 may identify multiple linear trends at different time scales by repeating the above analysis using different values for the number of consecutive samples appended to the buffer, for example.

Determining a nonlinear trend component of a signal may first include decomposing the signal into multiple components. The signal decomposition may be performed in a number of ways, such as using empirical mode decomposition. Components may be determined to be trend or noise components based on a comparison between a frequency in the component and a cut-off frequency. In addition, the processor 106 may identify multiple nonlinear trends at different time scales by repeating the above analysis using different values for the cut-off frequency, for example.

The identified trend may include any number of linear trends and any number of nonlinear trends. The identified trend may be chosen to be any combination of linear and nonlinear trends that minimizes an error, for example.

At step 324, the identified trend is subtracted from the signal to obtain a detrended signal.

At step 326, the processor 106 identifies a cyclic pattern in the detrended signal. Typically, a cyclic pattern includes faster fluctuations than a trend, such that the energy in a cyclic pattern is mostly concentrated near higher frequencies than the trend. The cyclic pattern is representative of a periodic feature repeated throughout a portion of the signal.

Determining the cyclic pattern may include first identifying a period of interest and segmenting the signal based on the identified period. The resulting segments may then be superimposed, thus building a point-by-point model of the cyclic pattern. In addition, the processor 106 may identify multiple cyclic components at different time scales by repeating the above analysis using different values for the period, for example, and the identified cyclic pattern may include any number of cyclic components.

At step 328, the cyclic pattern is subtracted from the detrended signal to obtain a residual signal. Typically, the energy in the residual signal is mostly concentrated near higher frequencies than the cyclic pattern or the trend because the residual signal is representative of a noisy portion of the signal.

Subtracting the long-term trend and cyclic pattern from a signal may result in a residual signal centered approximately around zero. After subtracting the identified trend and the identified cyclic pattern from the signal to obtain a residual signal, the processor 106 may proceed to steps 204-212 in method 200 to identify anomalies in the residual signal. Anomaly detection in a signal such as the residual signal may be performed using a statistics-based process. In particular, statistics-based anomaly detection often determines a range based on estimated statistics of the signal. For example, the range may correspond to a number of standard deviations away from a mean or median, and samples outside the range may be identified as anomalies. Compared to amplitude anomaly detection, statistics-based anomaly detection offers several advantages, such being more robust (the detection is less susceptible to noise), and having lower false alarm rates.

In an example, the signal may not include a trend, or it may be undesirable to estimate a trend in a signal. In this case, steps 322 and 324 may not be performed. In another example, the signal may not include a cyclic pattern, or it may be undesirable to estimate a cyclic pattern in a signal. In this case, steps 326 and 328 may not be performed.

FIG. 4 is a flow chart of one illustrative method 400 used by the processor 106 for estimating a historical probability distribution of samples in a signal. The depicted method 400 includes the steps of receiving a signal (step 430), removing outliers in the signal (step 432), computing a histogram of the remaining samples (step 434), extending the histogram (step 436), and obtaining a probability distribution by normalizing the histogram (step 438).

In particular, the method 400 may be used by the processor 106 to estimate a probability distribution of the received signal by using statistical estimation methods. It may be desirable to estimate a probability distribution of a received signal for detection of anomalies in the signal. For example, in network traffic, the estimated probability distribution may be used to detect anomalies in the network such as a traffic burst of data flow. Samples of the signal identified as outliers are removed from the signal, resulting in a subset of samples of the original signal. A histogram may be generated based on the subset of samples, and because the outliers have been removed, the histogram is confined to a limited range, or a histogram range. The histogram range may be extended by computing additional histogram values outside the limited range. For example, an exponential function may be used to estimate the shape and values of an extended histogram including the original histogram and the additional histogram values. Any other suitable function may be used to compute additional histogram values for extending the histogram range.

First, at step 430, the processor 106 receives a signal from the signal source 104. As described in relation to FIG. 1, the signal may be representative of an amount of traffic flow in a network, such as a number of data packets that arrive at a location within a particular time window. In other applications, the signal may be representative of other events or values, such as requests for certain files or network resources, or events or values not related to computer networks such as financial data. The signal may also be representative of a residual signal as described in relation to FIG. 3.

At step 432, the processor 106 removes outliers. In an example, outliers may be identified as samples in the signal with values outside a range. The range may be determined based on an estimated standard deviation and estimated mean, which may be determined from the same set of samples for identifying outliers. Alternatively, these values may be determined on a different set of data, previously received by the probability distribution estimator 102. The samples identified as outliers are removed from the set of samples, resulting in a subset of values.

An outlier may correspond to a sample in the set of data whose value exceeds a number of estimated standard deviations from an estimated mean. In particular, a range of values may be identified based on the estimated mean and the estimated standard deviation, and any values falling outside of the identified range may be labeled as outliers. As an example, the estimated mean may be computed as the true mean of the data, or alternatively, as the median or mode of the data. As another example, the estimated standard deviation may be computed based on a median absolute deviation between the data and the estimated mean. In particular, the median absolute deviation corresponds to the median of the absolute differences between each sample in the data and the estimated mean of the data. Rather than using the true mean and standard deviation, using the median as the estimated mean and basing the estimated standard deviation on the median absolute deviation results in a more robust outlier identification method. As an example, values for the median and median absolute deviation are not affected by large deviations of a small number of outliers. However, in general, any suitable method may be used to remove outliers from a set of samples.

At step 434, the processor 106 computes a histogram of the remaining subset of samples after outlier removal in step 432. For example, a user may provide input to the anomaly detector 102 including one or more histogram parameters, such as a number of bins and/or a bin width. If no user input is provided, default values may be used for the histogram parameters. Because the outliers were removed in step 432, the histogram of the remaining subset of samples is confined to a limited histogram range. In other words, the histogram has histogram values of zero outside the histogram range. In particular, the histogram range is at least as narrow as the range used for identifying outliers because the samples with values outside the outlier range have been already removed.

At step 436, the histogram is extended to produce an extended histogram. In particular, the extended histogram includes the original histogram computed at step 434 as well as additional histogram values that fall outside the histogram range. The processor 106 may use a parameterized function to compute these additional histogram values. As an illustrative, non-limiting example, the parameterized function may be an exponential function, such as:

$$y = a \times e^{-bx} \quad (1)$$

In particular, x corresponds to a value of the sample, and y corresponds to a histogram value. The parameters (a,b) are parameters of the exponential function, where a is an amplitude of the function, and b is a rate of decay of the function. The limits of the histogram range may be denoted as $(x_1, x_2)$, where $x_1$ is the lower limit, and $x_2$ is the upper limit.

Suitable values for the exponential parameters (a,b) may be determined by including one or more constraint. For example, one constraint may require that the histogram is smooth at the edges of the histogram range. This constraint may be used when determining the amplitude parameter a, such that the additional histogram values are appropriately scaled to maintain smoothness at the edges of the histogram range.

Another constraint may require that the sum of the additional histogram values is equal to or less than some predetermined fraction of the original histogram, or equivalently, of the resulting histogram after extension. For example, the sum of the additional histogram values may be restricted to represent 1% of the resulting histogram, or any other suitable amount. This constraint may be used when determining the rate of decay parameter b. In addition, this constraint may be used to determine cut-offs corresponding to the new histogram range. This constraint may be used if it is undesirable to have an extended histogram in which additional histogram values make up a large proportion of the extended histogram.

Different values for the exponential parameters (a,b) may be used for the two "tail" portions of the extended histogram. In particular, for the lower tail, the additional histogram values may be computed as:

$$y = a_1 \times e^{-b_1 x}, x_0 < x < x_1 \quad (2)$$

where x corresponds to a value of the sample (plotted on the horizontal axis of FIG. 4, for example), and y corresponds to an additional histogram value (which when normalized, is a probability such as the probability plotted on the vertical axis of FIG. 4). The amplitude parameter $a_1$ and the rate of decay parameter $b_1$ may be selected to satisfy any constraints. In particular, for a single modal distribution, the parameter $b_1$ is negative for the lower tail such that the additional histogram values monotonically increase as x increases.

For the higher tail, the additional histogram values may be computed as:

$$y = a_2 \times e^{-b_2 x}, x_2 < x < x_3. \quad (3)$$

Similar to the lower tail, the amplitude parameter $a_2$ and the rate of decay parameter $b_2$ may be selected to satisfy any constraints and may be different from the parameters for the lower tail ($a_1$, $b_1$). In particular, for a single modal distribution, the parameter $b_2$ is positive for the higher tail such that the additional histogram values monotonically decrease as x increases.

The above description describes using an exponential function to compute additional histogram values. Other functions may be used, such as polynomial functions with the form $y = \sum_{n=0}^{N} a_n \times x^{-n}$, heuristic functions or any other suitable function.

At step 438, the histogram is normalized to obtain an estimated probability distribution for the samples in the signal. In particular, the histogram may be normalized by the sum of all histogram values (including additional histogram values) such that the resulting elements sum to one. Because a histogram is by definition discrete, the estimated probability distribution corresponds to a probability mass function.

The estimated probability distribution is then used for detecting anomalies in a signal. In particular, the estimated probability distribution obtained at step 438 may be used to compute likelihood values of samples in a signal. When the signal represents an amount of data traffic in a network, the estimated probability distribution may represent amounts of data traffic during standard operation of the network, without traffic bursts for example. In this case, the estimated probability distribution would be useful for detecting anomalous behavior in the network such as a traffic burst.

In some embodiments, likelihood values are computed based on the estimated historical probability distribution of previously received samples of the signal. The estimated historical probability distribution may be updated with each received sample, such that a likelihood value for a sample is dependent on the immediately preceding sample. Alternatively, the probability distribution may be updated less frequently. For example, a set of samples may be used as training data for estimation of the probability distribution of samples in a signal. The training data may be updated when an appropriate amount of new samples is received.

Figure 5B:
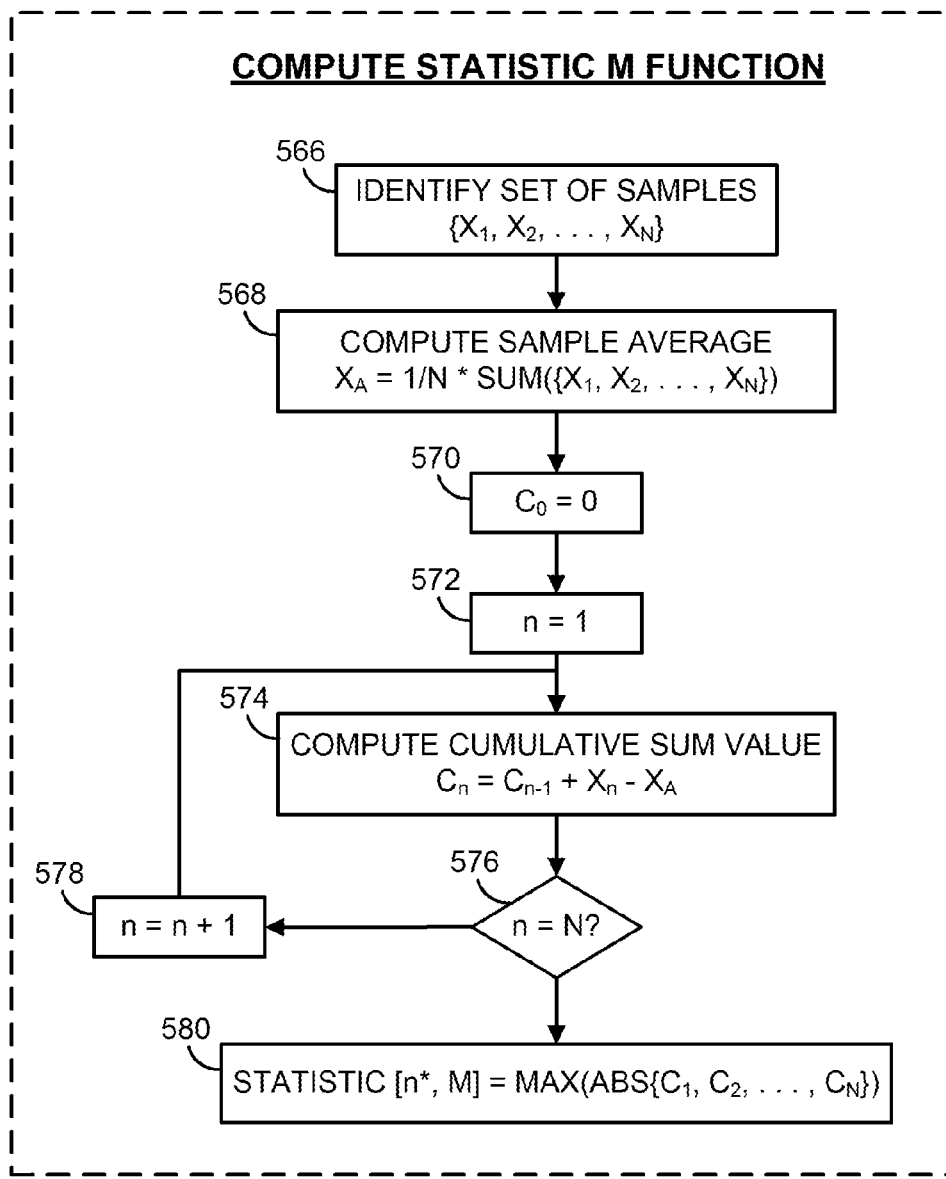
Figure 5C:
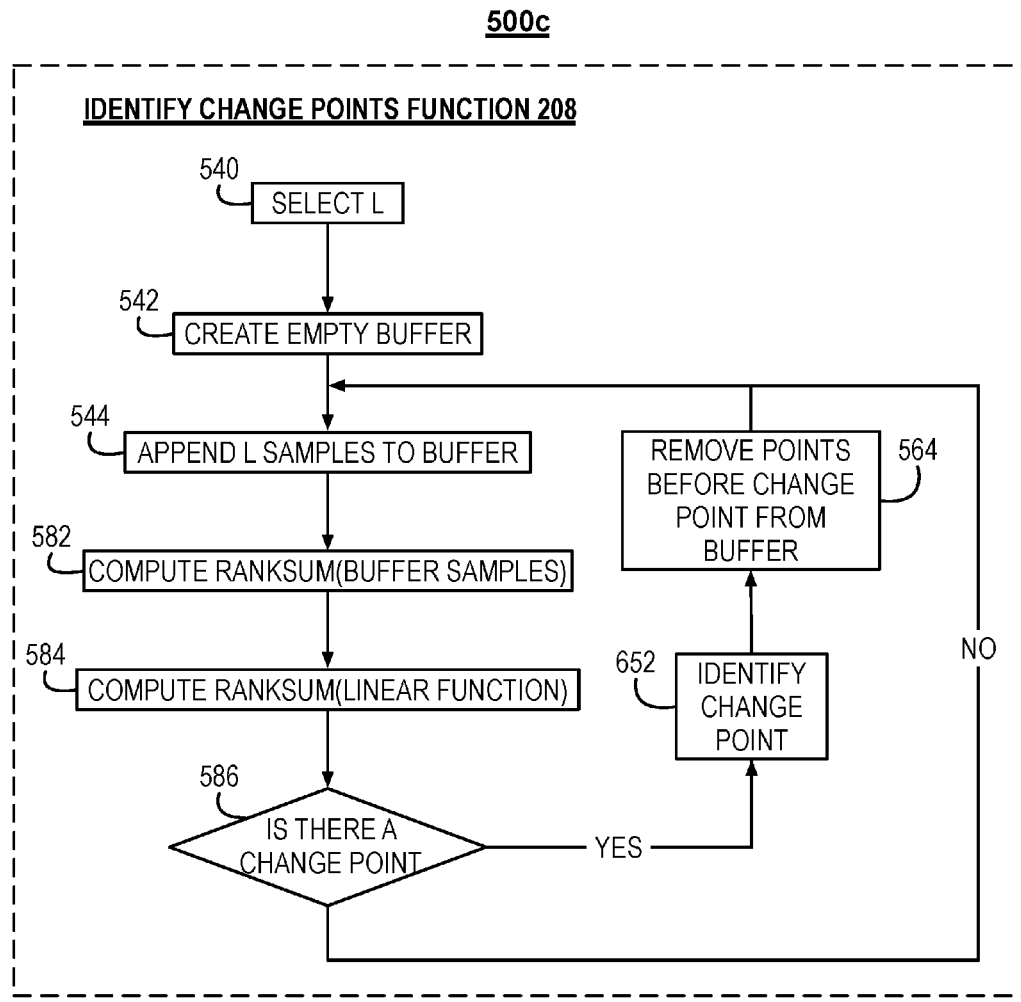

FIGS. 5A-5C are flow charts of illustrative methods used by the processor 106 for identifying change points in a likelihood sequence (i.e., such as the likelihood sequence computed at step 206). In particular, the methods illustrated in FIGS. 5A-5C may be used by the processor 106 to identify change points in a buffer using statistical methods. It may be desirable to segment a sequence into multiple segments at the identified change points, such that each segment may be considered separately for anomaly detection. As shown in the flow charts, change points in the likelihood sequence may be detected by identifying locations in the likelihood sequence where a statistic of the likelihood sequence's underlying distribution changes. The method illustrated in FIG. 5A is used for identifying changes in the mean of this underlying distribution, and the method illustrated in FIG. 5C is used for identifying changes in the median. The illustrated methods described herein are example techniques for identifying change points in a sequence. In general, any other suitable technique may be used to identifying change points.

FIG. 5A is a flow chart of one illustrative method 500a used by the processor 106 for identifying change points in a likelihood sequence. The depicted method 500a includes the steps of selecting a parameter L corresponding to a minimum length of a segment (step 540), creating an empty buffer (step 542), and appending the first L samples of the likelihood sequence to the buffer (step 544). A first statistic $M_B$ is computed based on a cumulative sum of the buffer samples (step 546), and random permutations of the buffer samples are generated (step 550), and an additional statistic $M_k$ is computed for each random permutation (step 552). The statistics $M_B$ and $M_k$ are compared (step 558), and the processor 106 determines whether there is a change point in the buffer based on the comparison (decision block 560). If there is a change point, the processor 106 identifies a sample in the buffer as a change point (step 562) and removes samples preceding the change point from the buffer (step 564) before appending the next L samples of the likelihood sequence to the buffer (step 544).

First, at step 540, the processor 106 selects a parameter L, corresponding to an integer number of samples in the likelihood sequence and representative of a minimum number of samples in a segment. The processor 106 may select L in a number of ways. In an example, a user provides input to the anomaly detector 102, and the processor 106 selects L based on the user input. In this case, the user input may be precisely L, or the processor 106 may process the user input to derive an appropriate value for L. For example, when the signal is a function of time, the user input may be a length of a time window representative of an expected minimum length of a trend, such as an hour, a day, a week, or any other suitable length of time. The processor 106 would then multiply the user input by the sampling rate of the signal to derive L.

The processor 106 may also select L based on known information about the signal or the type of signal. For example, the selection of L may be different for different types of signals or for different anomaly types. In particular, a large value for L may be selected if it is desirable to detect long anomalies. In contrast, a smaller L value may be selected if it is desirable to detect shorter anomalies. In addition, L may be fixed throughout the processing of the signal, or the processor 106 may be configured to use different values for L for different portions of the signal. For example, the value selected for L may be dependent on the values and/or rate of the incoming samples from the signal.

At step 542, the processor 106 creates an empty buffer. An empty buffer may be created by, for example, allocating an appropriate amount of space in the memory unit 108 or initializing a number of variables.

At step 544, the processor 106 appends L samples of the likelihood sequence to the buffer. In particular, the L samples correspond to the first L samples in the likelihood sequence, and the order of these L samples is maintained in the buffer. For example, when an amount of space in the memory unit 108 is allocated for the buffer, locations in the memory unit 108 may be used to store the appended samples to the buffer. Alternatively, the received samples in the likelihood sequence may already have corresponding storage locations, and these samples may simply be labeled with a flag variable indicating whether the sample is included in the buffer or not.

Because of the minimum length parameter of a segment L, it is assumed that at most one change point exists in the buffer at a time. This means that the samples in the buffer at any time are included at most two segments. A goal of the method 500a is to determine whether a change point exists in the buffer based on a change in a mean of the two segments (if there are two segments).

At step 546, a first statistic $M_B$ is computed based on the likelihood samples in the buffer. In particular, the statistic $M_B$ is representative of how likely a change point exists in the buffer. The statistic $M_B$ is computed based on a cumulative sum of the samples in the buffer. An illustrative example of how the statistic $M_B$ may be computed is described in more detail in relation to FIG. 5B, which depicts a function for computing a statistic for a set of samples (i.e., buffer samples).

At step 548, an iteration parameter k is initialized to 1. The iteration parameter k represents a label assigned to a random permutation to be performed on the buffer likelihood samples. In particular, after a random permutation is performed, the iteration parameter k is incremented (at step 556) until k reaches a total number of random permutations K. Any number of random permutations may be generated, and the number K of random permutations may be a parameter provided by a user. As an example, the number K may be fixed, or alternatively, the value for K may be related to the number of samples in the buffer or on the minimum segment length L. In particular, it may be desirable to use a smaller value for K for a buffer with a small number of samples compared to a buffer with a large number of samples. For example, for a buffer with length N, the total number of possible random permutations is N×(N−1)×(N−2)× . . . ×2×1, or N!. In some cases, it may be desirable to select K to be a certain percentage of all possible random permutations, such that the value for K may be selected based on N.

At step 550, a random permutation of the buffer samples is generated. In an example, a random permutation is a reordering of the buffer samples. In particular, a random permutation may be generated by sequentially selecting a random number uniformly distributed between 1 and N without replacement. However, in general, selection with replacement may also be used.

At step 552, the random permutation generated at step 550 are processed to compute a statistic $M_k$. In particular, the statistic $M_k$ is representative of how likely a change point exists in the randomly permuted buffer samples. The statistic $M_k$ is computed based on a cumulative sum of the random permutation. An illustrative example of how the statistic $M_k$ may be computed is described in more detail in relation to FIG. 5B, which depicts a function for computing a statistic for a set of samples (i.e., buffer samples).

At decision block 554, the processor 106 determines whether the iteration parameter k is equal to the total number of random permutations K. If not, the processor 106 proceeds to step 556 to increment k and step 550 to take another random permutation of the buffer samples.

When k is equal to K, this means that the desired total number of random permutations have been performed, and the processor 106 proceeds to step 558 to compare the statistic $M_B$ to the set of $M_k$ values (i.e., $M_1, M_2, \ldots M_K$). In an example, comparing $M_B$ to $M_k$ includes identifying a number of $M_k$ values that are greater than $M_B$ and/or identifying a number of $M_k$ values that are less than $M_B$. In another example, a difference between $M_B$ and $M_k$ may be computed to determine whether a change point exists in the buffer.

At decision block 560, the processor 106 determines whether there is a change point in the buffer. In particular, the processor 106 determines whether the value for the statistic $M_B$ is significant compared to the set of values for $M_k$. In an example, the statistic $M_B$ is determined to be significant if $M_B$ is greater than a threshold number of $M_k$ values, such as 95%, 98%, 99%, or any other suitable amount. In another example, the statistic $M_B$ is determined to be significant if $M_B$ is greater by a threshold amount of one or more values for $M_k$. For example, decision block 560 may require that $M_B$ exceeds $M_k$ by a threshold amount, such as $M_k$ multiplied by 1.5, 2, 3, or any other suitable amount.

If the statistic $M_B$ is significant (i.e., there is a change point in the buffer), the processor 106 proceeds to step 562 and identifies the change point in the buffer. In particular, the change point may be a buffer sample corresponding to a value of the cumulative sum in the original buffer sequence. As an example, the change point may be related to the statistic $M_B$ computed at step 546.

After identifying the change point in the buffer, the buffer samples are appropriately updated. In particular, at step 564, the points preceding the change point are removed from the buffer. After updating the buffer, the processor 106 returns to step 544 to append the next L samples in the likelihood sequence to the buffer. In another example, if, after removing samples preceding an identified change point from the buffer, the number of remaining samples is less than L, samples may be added to the buffer such that the number of buffer samples after adding new samples is L. In this case, the number of samples L may correspond to a desired total number of buffer samples.

Alternatively, if, at decision block 560, the processor 106 determines that there is no change point in the buffer, the processor 106 returns directly to step 544 to append the next L samples to the buffer.

FIG. 5B is a flow chart of one illustrative method 500*b* used by the processor 106 for computing a statistic M in a set of samples. The depicted method 500*b* includes the steps of identifying a set of samples (step 566), computing a sample average (step 568), initializing an initial cumulative sum value $C_0$ to 0 (step 570), and initializing an iteration parameter n to 1 (step 572). The method 500*b* further includes the steps of iteratively computing a cumulative sum value G (step 574) for multiple values of n (n=1, 2, ... N), where N is the number of samples in the received set. When a cumulative sum value $C_n$ has been computed for each sample in the received set, a statistic M is computed as the maximum value of the cumulative sum (step 580).

At step 566, the processor 106 identifies a set of samples. In particular, the set of samples corresponds to the samples in the buffer. There are N samples in the buffer, and the N samples are labeled as $\{X_1, X_2, \ldots, X_N\}$.

At step 568, the processor 106 computes a sample average. The sample average is denoted as $X_A$, and $X_A$ is the average of the buffer samples:

$$X_A = \frac{1}{N} \sum_{i=1}^{N} X_i.$$

At step 570, an initial cumulative sum variable $C_0$ is set to 0, and at step 572, an iteration parameter n is initialized to 1.

At step 574, the cumulative sum value $C_n$ is computed. A cumulative sum of a set of samples is calculated by forming a sequence of partial sums of the samples. As an example, the cumulative sum value $C_n$ may be computed as $C_n = C_{n-1} + X_n - X_A$. In particular, the cumulative sum value $C_n$ may be computed by adding the previous cumulative sum value $C_n-1$ to the difference between the current sample value $X_n$ and the sample average $X_A$. Thus, the cumulative sum $C_n$ is a cumulative sum of the differences between the sample values and the sample average. These differences sum to zero, such that the cumulative sum ends at zero (i.e., $C_N=0$). Therefore, the cumulative sum sequence begins (i.e., $C_0=0$) and ends at zero.

The step 574 illustrates just one possible equation for computing a cumulative sum value. In general, any suitable method for computing a cumulative sum value may be used to compute a value for $C_n$. As an example, the cumulative sum value $C_n$ may be computed using the equation: $C_n = \sum_{i=1}^{n} (X_i - X_A)$ to give an equivalent result. Thus, each value in the cumulative sum corresponds to a partial sum of the differences between the buffer samples preceding and including the corresponding buffer sample and the sample average.

The iteration parameter n is incremented at step 578, and the next cumulative sum value $C_n$ is computed until n equals the total number of samples in the set N (determined at decision block 576), such that a complete cumulative sum sequence is computed. Once the complete cumulative sum sequence is formed, the processor 106 proceeds to step 580 to compute the statistic M as the maximum of the absolute values in the cumulative sum sequence. In addition, the index of the maximum absolute cumulative sum value may also be identified as n*.

The processor 106 calls the function illustrated in FIG. 5B for computing a statistic $M_B$ corresponding to the original buffer samples. The sample $X_{n*}$ corresponds to the most likely sample in the buffer to be a change point, and the statistic $M_B$ is compared to other statistics $M_k$ to determine whether $M_B$ is significant. When $M_B$ is significant, $X_{n*}$ is identified as the change point at step 562. A description of the comparison and how this comparison may result in identification of a change point is described in relation to the illustrative example below.

As an illustrative example, assume that the buffer samples include a likelihood change point, such that the first half (samples $X_1, X_2, \ldots X_{N/2}$) have high likelihoods $L_{high}$ (i.e., these samples in the first half of the buffer are near a centroid of the historical probability distribution. The second half (samples $X_{N/2+1}, X_{N/2+2}, \ldots, X_N$) have low likelihoods $L_{low}$ (i.e., these samples corresponding to the likelihood samples in the second half of the buffer are far from a centroid of the historical probability distribution). In this case, the average likelihood value is between $L_{high}$ and $L_{low}$, such that the difference between $L_{high}$ and the average is positive, and the difference between $L_{low}$ and the average is negative. Thus, the cumulative sum sequence will increase during the first half of the sequence, and decrease during the second half of the sequence. In this example, the maximum absolute value in the cumulative sum $M_B$ is large because the first half of the buffer samples have high likelihood values above the average. Then, when the buffer samples are randomly permuted, the high and low likelihoods will likely mix. When the high and low likelihood values are not separated as described for the original order of the buffer samples, the cumulative sum sequence will have a smaller value for $M_k$. As an example, if the samples are mixed such that a high likelihood value is usually followed by a low likelihood, and vice versa, the cumulative sum will generally be centered around zero, and the maximum absolute value of the cumulative sum will be small. Therefore, when comparing $M_B$ to the values $M_k$, it is expected that if a change point exists in the buffer, then $M_B$ should be large compared to a typical value for $M_k$.

FIG. 5C is a flow chart of one illustrative method 500c used by the processor 106 for identifying change points in a likelihood sequence. In particular, the method 500c is used for detecting changes in the median of a set of values. The depicted method 500c includes the steps of selecting a parameter L corresponding to a minimum length of a segment (step 540), creating an empty buffer (step 542), and appending the first L samples of the likelihood sequence to the buffer (step 544). A rank sum of the buffer likelihood samples is computed (step 582), and a rank sum of a linear function is also computed (step 584). Based on the rank sums, the processor 106 determines whether there is a likelihood change point in the buffer (decision block 586). If so, the processor 106 identifies the change point (step 562) and removes the points before the change point from the buffer (step 564) before appending the next L samples to the buffer (step 544). If there is not a change point in the buffer, the processor 106 directly appends the next L samples to the buffer (step 544).

First, steps 540, 542, and 544 are the same as described in relation to FIG. 5A. In particular, at step 540, the processor 106 selects a parameter L, corresponding to an integer number of samples in the likelihood sequence and representative of a minimum number of samples in a segment. At step 542, the processor 106 creates an empty buffer, and at step 544, the processor 106 appends L samples of the likelihood sequence to the buffer. A goal of the method 500c is to determine whether a likelihood change point exists in the buffer based on a change in a median of the two segments in the buffer (if there are two segments).

At step 582, a rank sum is computed based on the buffer likelihood samples. In particular, the buffer samples may be assigned labels corresponding to their rank in the buffer (i.e., the lowest valued buffer sample is assigned 1, the second lowest valued buffer sample is assigned 2, etc.). A rank sum corresponds to the partial sum of these labels.

At decision block 586, the processor 106 determines whether there is a likelihood change point in the buffer based on the rank sum sequence computed at step 582. As an illustrative example, assume that the buffer samples include a change point at the halfway point in the buffer, such that the first half (samples $X_1, X_2, \ldots X_{N/2}$) have lower likelihoods than the second half (samples $X_{N/2+1}$, $X_{N/2+2}, \ldots, X_N$). In this case, the first half of the buffer samples have lower rank (1 to N/2) than the second half (N/2+1 to N). One way to detect the change point is to iteratively select a sample $X_n$ in the buffer and determine whether the preceding samples ($X_1$ to $X_n$) have ranks 1 to n (corresponding to low values). This would mean that all buffer samples preceding the sample $X_n$ have lower rank than all buffer samples following the sample $X_n$. In this case, $X_n$ would represent a change point indicative of a change in median.

An equivalent and more efficient way to detect the change point is to compare the rank sum computed at step 582 to a rank sum of a linear sequence. In particular, the linear sequence may be simply [1, 2, 3, . . . N], such that if the rank sum of the buffer samples is ever equal to the rank sum of the linear sequence for a selected buffer sample, this would mean that the samples preceding the selected buffer sample would have lower rank than the following buffer samples. In this case, if a rank sum value of the buffer samples were equal to a corresponding value in the rank sum of the linear sequence, this would mean that the buffer samples preceding the sample corresponding to the rank sum value each have lower rank than each of the following buffer samples. Thus, this may be indicative that the corresponding sample in the buffer is a likelihood change point. In another example, the linear sequence may be in decreasing order [N, N−1, . . . , 2, 1]. Using the decreasing linear sequence would be useful for detecting change points where the preceding samples have higher rank than the following buffer samples.

In some embodiments, it may be desirable to identify change points for which not all preceding buffer samples have lower rank than each following buffer sample. For example, it may be desirable to identify a change point if just one buffer sample is out of order. In this case, the requirement for identifying a change point in the buffer using rank sum may be relaxed to include rank sum values that fall within some range around the linear sequence rank sum.

Steps 562 and 564 are the same as described in relation to FIG. 5A. In particular, if there is a change point in the buffer, the processor 106 proceeds to step 562 and identifies the change point in the buffer. After identifying the change point in the buffer, the buffer samples are appropriately updated. At step 564, the points preceding the change point are removed from the buffer. After updating the buffer, the processor 106 returns to step 544 to append the next L samples in the likelihood sequence to the buffer.

Alternatively, if, at decision block 586, the processor 106 determines that there is no change point in the buffer, the processor 106 returns directly to step 544 to append the next L samples to the buffer.

FIG. 6 is a flow chart of one illustrative method 600 used by the processor 106 for identifying anomalous segments. The method 600 may be called by the processor 106 at step 212 in the method 200. The depicted method 600 includes the steps of initializing a segment iteration parameter j (step 680) and determining whether the $j^{th}$ segment is anomalous (decision block 682). If segment j is anomalous, the segment is labeled as an anomaly (step 686). The segments are iteratively considered until the last segment is reached.

First, at step 680, the processor 106 initializes the segment iteration parameter j. The parameter j corresponds to a label assigned to a segment.

At step 682, the processor 106 determines whether segment j is anomalous. In an example, the processor 106 compares a statistic of the segment j to a statistic of the historical probability distribution. For example, the statistic may be a median of the sample values in the segment j or of the historical probability distribution, such that if the median of segment j exceeds the median of the historical probability distribution by some threshold amount, the segment j may be identified as anomalous. The threshold may be a fixed amount or related to a statistic such as standard deviation. In an example, the median of segment j may be required to be at least two standard deviations from the median of the historical probability distribution in order for the segment j to be considered anomalous. In general, any number of standard deviations may be used. In another example, the statistic may be a mean, such that if the mean of segment j exceeds the mean of the historical probability distribution by some threshold amount, the segment j may be identified as anomalous. In general, any statistic may be used to determine whether a segment is anomalous, such as a median, mean, mode, or any other suitable statistic.

At decision block 684, the processor 106 determines whether the segment j is anomalous. The processor 106 may make this determination based on the results of step 682.

If segment j is determined to be anomalous, the method 600 proceeds to step 686, where the segment j is labeled as an anomaly. In particular, segment j may have an associated flag variable indicative of whether the segment is an anomaly. To label the segment j as an anomaly, the corresponding flag variable may be flipped.

Otherwise, the segment j is not anomalous, and the method 600 proceeds to decision block 688, where the processor 106 determines whether the segment j is the last segment. If segment j is not the last segment, the processor 106 increments the iteration parameter j at step 690 and returns to step 682 to determine whether the next segment is anomalous. After all segments have been considered, the method 600 ends at step 692.

Figure 7A:
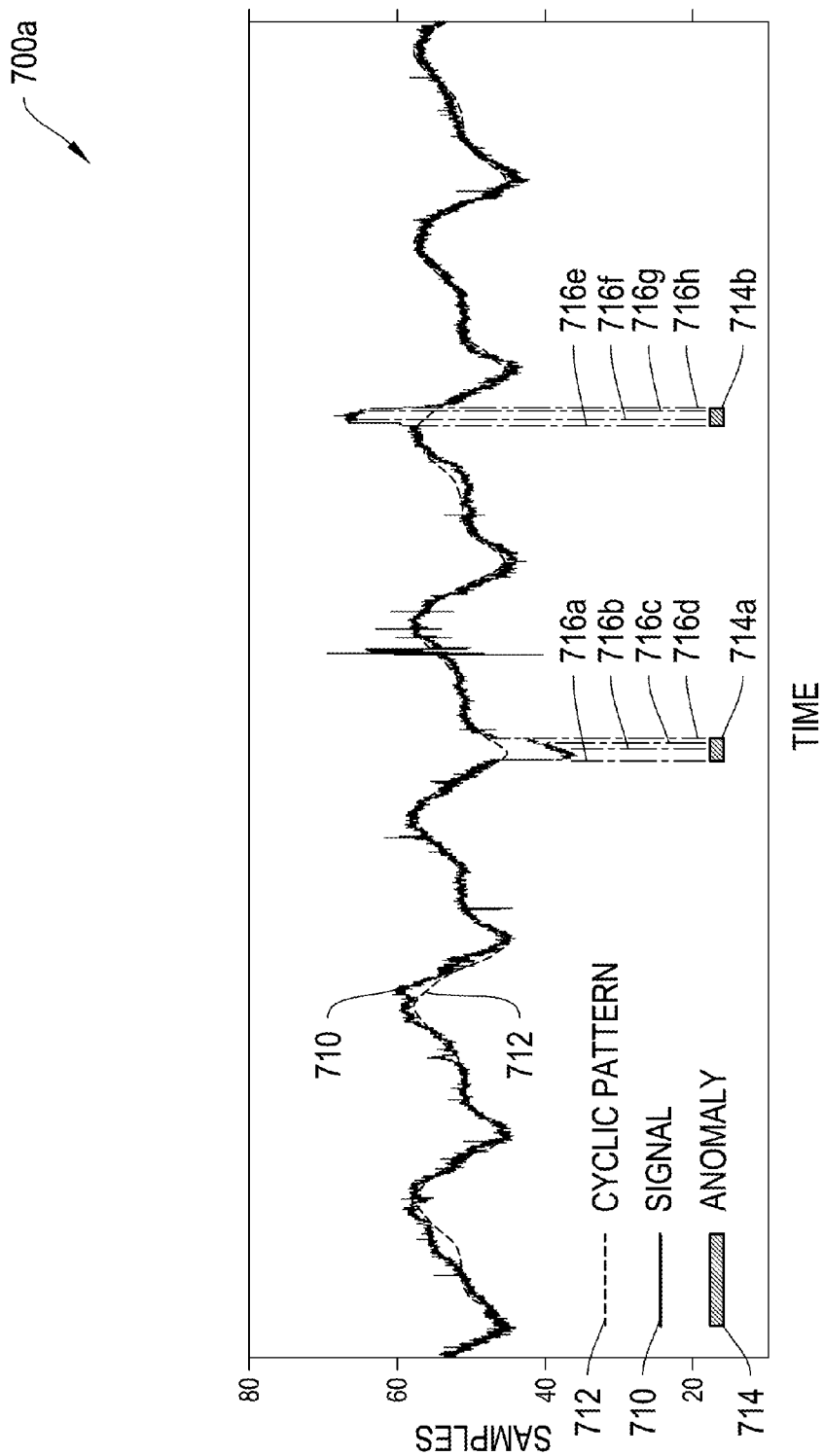
FIGS. 7A-7B depict graphs of detected anomalies in example signals.
Figure 7B:
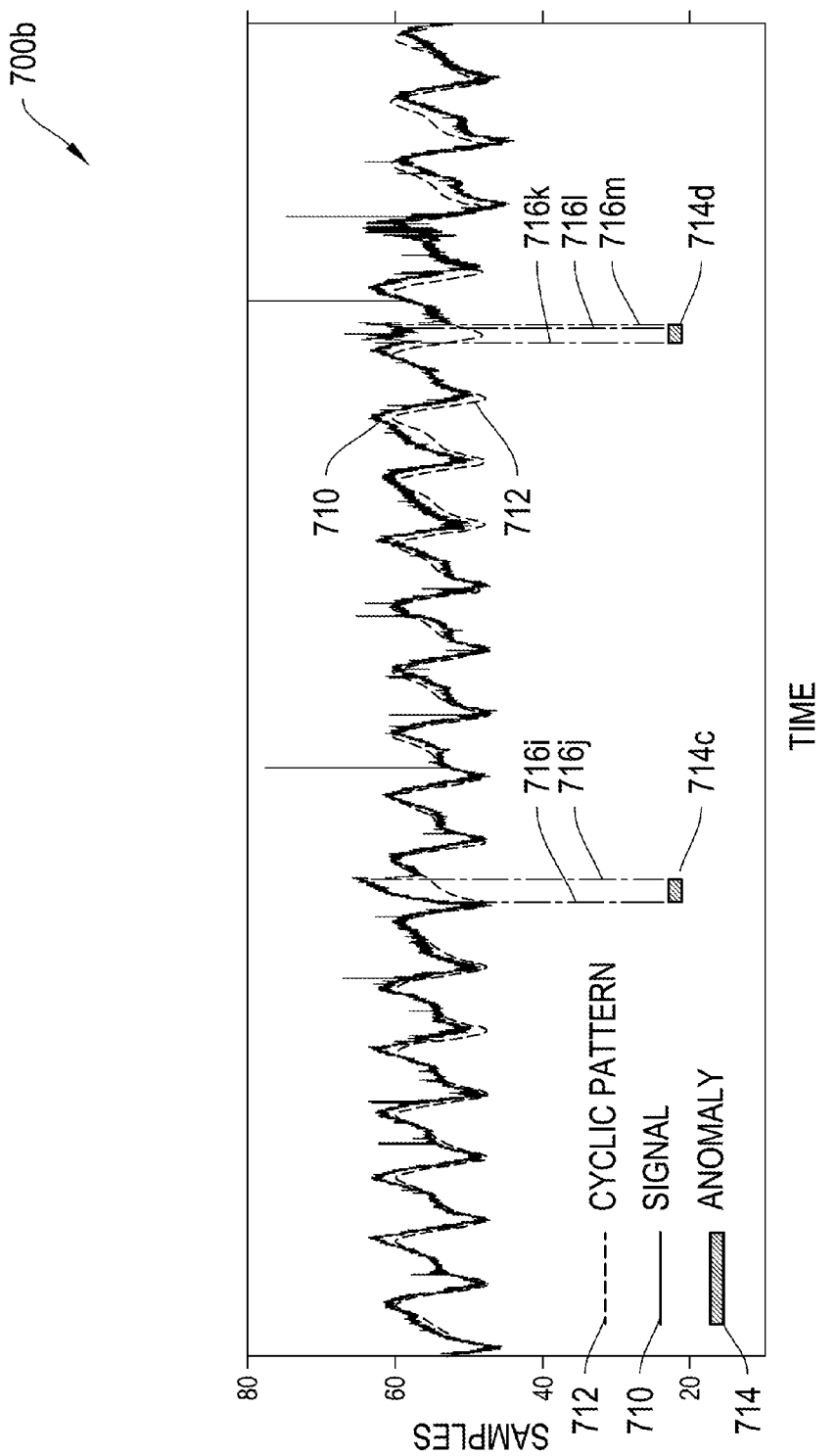

FIGS. 7A-7B are diagrams 700a and 700b of example signals 710, including marks corresponding to identified anomalies 714a-714d (generally, anomaly 714). A cyclic pattern 712 is also shown, and the cyclic pattern 712 was subtracted from the signal 710 as described in relation to FIG. 3 to obtain a residual signal. In particular, signals 710 correspond to a number of samples (y-axes) as a function of time (x-axes). The number of samples corresponds to an aggregate bit rate of data packets across multiple locations in a network, but the signals 710 are shown for illustrative purposes only. In general, any signal may be used.

Identified change points 716a-716m (generally, change point 716) correspond to x-coordinates in the signal 710 detected by a system such as the anomaly detector 102 in FIG. 1. The change points 716 are samples in the original signal 710 that correspond to identified likelihood change points in the corresponding likelihood sequence. The anomaly detector 102 may have used the methods 500a or 500c to process the residual signal (i.e., the difference between the signal 710 and the cyclic pattern 712) to detect the locations of change points 716. As an example, the anomaly detector 102 may have selected a parameter L as the minimum length of a segment and iteratively appended L samples of a likelihood function of the residual signal to a buffer. The anomaly detector 102 may then compute a cumulative sum or a rank sum of the buffer samples to detect a shift in the mean or median of the buffer samples. Then, based at least in part on the computed cumulative sum or rank sum, the anomaly detector 102 would identify the change point in the buffer and remove samples preceding the identified change point from the buffer. Then another L samples of the likelihood function of the residual signal would be appended to the buffer. The anomaly detector 102 would repeat these steps until all samples of the residual signal have been in the buffer. The residual signal would then be subdivided into multiple segments based on the identified change points.

After identifying the change points 716 and performing the segmentation, the anomaly detector 102 may have used the method 600 to identify anomalous segments in the residual signal. In particular, a statistic of each segment may be iteratively compared to a statistic of the historical probability distribution. For a residual signal, the historical probability distribution is typically centered around approximately zero and is typically a centroid distribution, such that the mean or median of the historical probability distribution is near zero. The anomaly detector 102 may determine that a segment is anomalous if its median (or mean) falls outside a range around the median (or mean) of the historical probability distribution. The range may be based on a number of standard deviations, estimated from the historical probability distribution.

In diagram 700a, the anomaly 714a is between the change points 716a and 716d. In this case, three consecutive segments defined by the change points 716a, 716b, 716c, and 716d were each determined to be anomalous by the anomaly detector 102. Consecutive anomalous segments may be combined to form a single anomaly such as anomaly 714a. Similarly, anomaly 714b includes three anomalous segments defined by change points 716e, 716f, 716g, and 716h. In diagram 700b, a single segment defined by change points 716i and 716j is included in the anomaly 714c, while two segments defined by change points 716k, 7161, and 716m are included in the anomaly 714d. In general, an anomaly 716 may include or exclude either sample corresponding to the change points defining the beginning and end of the anomaly.

Figure 8:
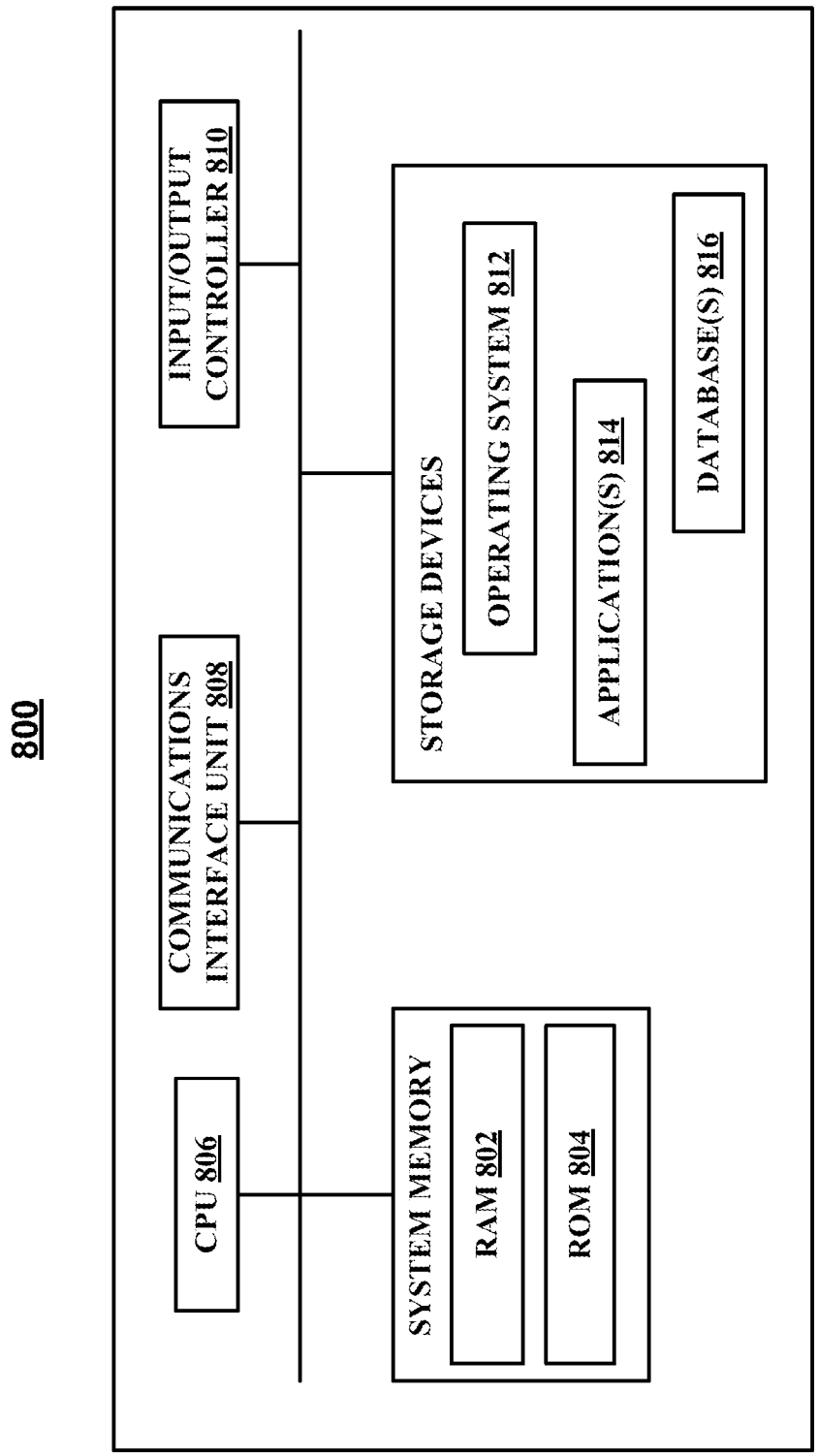
FIG. 8 is a block diagram of a computing device for performing any of the processes described herein.

FIG. 8 is a block diagram of a computing device, such as any of the components of the system of FIG. 1, for performing any of the processes described herein. Each of the components of these systems may be implemented on one or more computing devices 800. In certain aspects, a plurality of the components of these systems may be included within one computing device 800. In certain implementations, a component and a storage device may be implemented across several computing devices 800.

The computing device 800 comprises at least one communications interface unit, an input/output controller 810, system memory, and one or more data storage devices. The system memory includes at least one random access memory (RAM 802) and at least one read-only memory (ROM 804). All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 is linked, via network or local network, to other servers or systems.

The computing device 800 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 808 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 806 comprises a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals.

The CPU 806 is also in communication with the data storage device. The data storage device may comprise an appropriate combination of magnetic, optical or semiconductor memory, and may include, for example, RAM 802, ROM 804, flash drive, an optical disc such as a compact disc or a hard disk or drive. The CPU 806 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 806 may be connected to the data storage device via the communications interface unit 808. The CPU 806 may be configured to perform one or more particular processing functions.

The data storage device may store, for example, (i) an operating system 812 for the computing device 800; (ii) one or more applications 814 (e.g., computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program.

The operating system 812 and applications 814 may be stored, for example, in a compressed, an uncompiled and an encrypted format, and may include computer program code. The instructions of the program may be read into a main memory of the processor from a computer-readable medium other than the data storage device, such as from the ROM 804 or from the RAM 802. While execution of sequences of instructions in the program causes the CPU 806 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to identifying an anomaly as described herein. The program also may include program elements such as an operating system 812, a database management system and "device drivers" that allow the processor to interface with computer peripheral devices (e.g., a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 806 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 800 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The invention claimed is:

1. A method for identifying an anomaly in a signal, comprising:
   receiving a discrete signal, having sample values corresponding to amounts of data flow in a network within a time interval;
   generating a sequence of likelihoods corresponding to sample values in the signal and based at least in part on a historical probability distribution of previously received sample values corresponding to amounts of data flow in the network, wherein a likelihood is a probability of occurrence of a corresponding sample value in the signal;
   identifying likelihood change points in the likelihood sequence by:
      selecting a parameter L corresponding to a minimum number of samples in a segment;
      appending L consecutive likelihoods to a buffer;

computing a sequence of first sum values of the likelihoods in the buffer;

obtaining a sequence of second sum values;

determining the presence of a change point in the buffer based at least in part on a comparison between the first and second sum values, wherein a plurality of likelihoods preceding the change point have a first statistic value and a plurality of likelihoods following the change point have a second statistic value different from the first statistic value; and identifying a likelihood in the buffer as a change point based at least in part on the comparison;

segmenting the discrete signal into a plurality of segments at samples corresponding to the identified change points such that a respective one of the samples corresponding to the identified change points is at one of a beginning or an end of each of the plurality of segments;

identifying a segment as an anomaly based on a comparison between a statistic of the segment and a statistic of the historical probability distribution; and reconfiguring, responsive to identifying the segment as the anomaly, a component of the network.

2. The method of claim 1, wherein an anomaly is indicative of a deviation in the data flow from standard network operation.

3. The method of claim 1, wherein the historical probability distribution represents amounts of data flow during standard network operation.

4. The method of claim 1, wherein:

the first and second statistic values are mean values of the corresponding likelihoods;

the sequence of first sum values is based on a cumulative sum sequence of the likelihoods in the buffer; and the sequence of second sum values is based on a cumulative sum sequence of randomly reordered likelihoods in the buffer.

5. The method of claim 4, wherein:

a cumulative sum sequence is computed based on a sequence of differences between the likelihoods and a mean of the likelihoods in the buffer;

a change point is determined to be in the buffer when a maximal absolute first sum value exceeds a maximal absolute second sum value; and the change point corresponds to the maximal absolute first sum value.

6. The method of claim 1, wherein:

the first and second statistic values are median values of the corresponding likelihoods; the sequence of first sum values is based on a rank sum sequence of the likelihoods in the buffer;

the sequence of second sum values is based on a rank sum sequence of a linear function; and the change point is identified as the likelihood corresponding to a first sum value substantially equal to a corresponding second sum value.

7. The method of claim 1, comprising:

removing samples preceding the identified change point from the buffer; and appending another L likelihoods to the buffer.

8. The method of claim 1, wherein the statistic of the segment and the statistic of the historical probability distribution are medians of the corresponding sample values.

9. The method of claim 1, wherein the component is a network buffer.

10. An apparatus for identifying an anomaly in a signal, comprising a processor and a memory unit storing computer executable instructions that when executed by the processor cause the processor to:

receive a discrete signal, having sample values corresponding to amounts of data flow in a network within a time interval;

generate a sequence of likelihoods corresponding to sample values in the signal and based at least in part on a historical probability distribution of previously received sample values corresponding to amounts of data flow in the network, wherein a likelihood is a probability of occurrence of a corresponding sample value in the signal;

identify likelihood change points in the likelihood sequence, by:

selecting a parameter L corresponding to a minimum number of samples in a segment;

appending L consecutive likelihoods to a buffer;

computing a sequence of first sum values of the likelihoods in the buffer;

obtaining a sequence of second sum values;

determining the presence of a change point in the buffer based at least in part on a comparison between the first and second sum values, wherein a plurality of likelihoods preceding the change point have a first statistic value and a plurality of likelihoods following the change point have a second statistic value different from the first statistic value; and identifying a likelihood in the buffer as a change point based at least in part on the comparison;

segment the discrete signal into a plurality of segments at samples corresponding to the identified change points such that a respective one of the samples corresponding to the identified change points is at one of a beginning or an end of each of the plurality of segments;

identify a segment as an anomaly based on a comparison between a statistic of the segment and a statistic of the historical probability distribution; and reconfigure, responsive to identifying the segment as the anomaly, a component of the network.

11. The apparatus of claim 10, wherein an anomaly is indicative of a deviation in the data flow from standard network operation.

12. The apparatus of claim 10, wherein the historical probability distribution represents amounts of data flow during standard network operation.

13. The apparatus of claim 10, wherein:

the first and second statistic values are mean values of the corresponding likelihoods;

the sequence of first sum values is based on a cumulative sum sequence of the likelihoods in the buffer; and the sequence of second sum values is based on a cumulative sum sequence of randomly reordered likelihoods in the buffer.

14. The apparatus of claim 13, wherein:

a cumulative sum sequence is computed based on a sequence of differences between the likelihoods and a mean of the likelihoods in the buffer;

a change point is determined to be in the buffer when a maximal absolute first sum value exceeds a maximal absolute second sum value; and the change point corresponds to the maximal absolute first sum value.

15. The apparatus of claim 10, wherein:
the first and second statistic values are median values of the corresponding likelihoods; the sequence of first sum values is based on a rank sum sequence of the likelihoods in the buffer;
the sequence of second sum values is based on a rank sum sequence of a linear function; and
the change point is identified as the likelihood corresponding to a first sum value substantially equal to a corresponding second sum value.

16. The apparatus of claim 10, the instructions causing the processor to:
remove samples preceding the identified change point from the buffer; and
append another L likelihoods to the buffer.

17. The apparatus of claim 10, wherein the statistic of the segment and the statistic of the historical probability distribution are medians of the corresponding sample values.

18. The apparatus of claim 10, wherein the component is a network buffer.

* * * * *